United States Patent
Bae et al.

(10) Patent No.: US 12,520,304 B2
(45) Date of Patent: Jan. 6, 2026

(54) METHOD FOR TRANSMITTING UPLINK CHANNEL, USER DEVICE, PROCESSING DEVICE, STORAGE MEDIUM AND COMPUTER PROGRAM, AND METHOD FOR RECEIVING UPLINK CHANNEL, AND BASE STATION

(71) Applicant: LG ELECTRONICS INC., Seoul (KR)

(72) Inventors: Duckhyun Bae, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 400 days.

(21) Appl. No.: 18/019,661

(22) PCT Filed: Aug. 6, 2021

(86) PCT No.: PCT/KR2021/010395
§ 371 (c)(1),
(2) Date: Feb. 3, 2023

(87) PCT Pub. No.: WO2022/031102
PCT Pub. Date: Feb. 10, 2022

(65) Prior Publication Data
US 2023/0309090 A1    Sep. 28, 2023

(30) Foreign Application Priority Data

Aug. 6, 2020 (KR) .................. 10-2020-0098852

(51) Int. Cl.
H04W 72/14 (2009.01)
H04L 1/1812 (2023.01)
H04W 72/1268 (2023.01)

(52) U.S. Cl.
CPC ....... H04W 72/1268 (2013.01); H04L 1/1812 (2013.01)

(58) Field of Classification Search
CPC ... H04L 1/1812; H04L 1/1822; H04L 1/1854; H04L 1/1887; H04L 1/189; H04L 1/1896;
(Continued)

(56) References Cited

U.S. PATENT DOCUMENTS

2019/0230691 A1    7/2019  Cao et al.
2020/0154469 A1*   5/2020  Chin ................ H04L 1/1822
(Continued)

FOREIGN PATENT DOCUMENTS

KR   20180098139           9/2018
KR   20180098139 A    *    9/2018
WO   2020090091            9/2021

*Primary Examiner* — Phuc H Tran
(74) *Attorney, Agent, or Firm* — BRYAN CAVE LEIGHTON PAISNER LLP

(57) ABSTRACT

A UE can receive a UL grant setting for set UL grants. The UE determines hybrid automatic repeat request (HARQ) process identifiers (IDs) for cycles of the set UL grants on the basis of the UL grant setting, and can perform UL channel transmission in at least one of transmission periods corresponding to the set UL grants within the cycles on the basis of the determined HARQ process IDs. Determining the HARQ process IDs for the cycles can include determining start HARQ process IDs of the HARQ process IDs on the basis of HARQ process ID intervals. The HARQ process ID intervals are the minimum differences among the start HARQ process IDs for different cycles.

19 Claims, 11 Drawing Sheets

(58) Field of Classification Search
CPC ....... H04L 5/00; H04W 72/11; H04W 72/115; H04W 72/1268; H04W 72/23
See application file for complete search history.

(56) References Cited

U.S. PATENT DOCUMENTS

| | | |
|---|---|---|
| 2020/0229182 A1 | 7/2020 | Khoshnevisan et al. |
| 2021/0378006 A1* | 12/2021 | Takeda .................. H04W 52/04 |

* cited by examiner

METHOD FOR TRANSMITTING UPLINK CHANNEL, USER DEVICE, PROCESSING DEVICE, STORAGE MEDIUM AND COMPUTER PROGRAM, AND METHOD FOR RECEIVING UPLINK CHANNEL, AND BASE STATION

CROSS-REFERENCE TO RELATED APPLICATIONS

This application is a National Stage filing under 35 U.S.C. 371 of International Application No. PCT/KR2021/010395, filed on Aug. 6, 2021, which claims the benefit of earlier filing date and right of priority to Korean Patent Application No. 10-2020-0098852, filed on Aug. 6, 2020, the contents of which are all incorporated by reference herein in their entirety.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MEMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

According to an aspect of the present disclosure, a method of transmitting an uplink (UL) channel by a user equipment (UE) in a wireless communication system is provided. The method includes receiving a UL grant configuration for configured UL grants, determining hybrid automatic repeat request (HARQ) process IDs for a period of the configured UL grants based on the UL grant configuration, and performing UL channel transmission in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval, and the HARQ process ID interval is a minimum difference between starting HARQ process IDs for different periods.

According to another aspect of the present disclosure, a user equipment (UE) for transmitting an uplink (UL) channel by a user equipment (UE) in a wireless communication system is provided. The UE includes at least one transceiver, at least one processor, and at least one computer memory operatively connected to the at least one processor and configured to store instructions that when executed causes the at least one processor to perform operations including receiving a UL grant configuration for configured UL grants, determining hybrid automatic repeat request (HARQ) process IDs for a period of the configured UL grants based on the UL grant configuration, and performing UL channel transmission in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval, and the HARQ process ID interval is a minimum difference between starting HARQ process IDs for different periods.

According to another aspect of the present disclosure, a processing device in a wireless communication system is provided. The processing device includes at least one processor, and at least one computer memory operatively connected to the at least one processor and configured to store instructions that when executed causes the at least one processor to perform operations. The operations include receiving a UL grant configuration for configured UL grants, determining hybrid automatic repeat request (HARQ) process IDs for a period of the configured UL grants based on the UL grant configuration, and performing UL channel transmission in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval, and the HARQ process ID interval is a minimum difference between starting HARQ process IDs for different periods.

According to another aspect of the present disclosure, a computer-readable storage medium is provided. The computer-readable storage medium stores at least one computer program including instructions for causing at least one processor to perform operations for a user equipment (UE) when being executed by the at least one processor. The operations include receiving a UL grant configuration for configured UL grants, determining hybrid automatic repeat request (HARQ) process IDs for a period of the configured UL grants based on the UL grant configuration, and performing UL channel transmission in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval, and the HARQ process ID interval is a minimum difference between starting HARQ process IDs for different periods.

According to another aspect of the present disclosure, a computer program stored in a computer program-readable storage medium is provided. The computer program includes at least one program code including instructions for causing at least one processor to perform operations when being executed, and the operations include receiving a UL grant configuration for configured UL grants, determining hybrid automatic repeat request (HARQ) process IDs for a period of the configured UL grants based on the UL grant configuration, and performing UL channel transmission in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval, and the HARQ process ID interval is a minimum difference between starting HARQ process IDs for different periods.

According to another aspect of the present disclosure, a method of receiving an uplink (UL) channel from a user equipment (UE) in a wireless communication system is provided. The method includes transmitting a UL grant configuration for configured UL grants, determining hybrid automatic repeat request (HARQ) process IDs for a period of the configured UL grants based on the UL grant configuration, and receiving UL channel transmission in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval, and the HARQ process ID interval is a minimum difference between starting HARQ process IDs for different periods.

According to another aspect of the present disclosure, base station (BS) for receiving an uplink (UL) channel from a user equipment (UE) in a wireless communication system is provided. The BS includes at least one transceiver, at least one processor, and at least one computer memory operatively connected to the at least one processor and configured to store instructions that when executed causes the at least one processor to perform operations. The operations include transmitting a UL grant configuration for configured UL grants, determining hybrid automatic repeat request (HARQ) process IDs for a period of the configured UL grants based on the UL grant configuration, and receiving UL channel transmission in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval, and the HARQ process ID interval is a minimum difference between starting HARQ process IDs for different periods.

According to each aspect of the present disclosure, determining the HARQ process IDs for the period may include determining the starting HARQ process ID among the HARQ process IDs based on a start symbol index of a first transmission occasion in the period, a number of available HARQ processes for the UL grant configuration, a HARQ process offset by the UL grant configuration, and the HARQ process ID interval.

According to each aspect of the present disclosure, the starting HARQ process ID may be determined according to a following equation, Ceil(start symbol index/periodicity)* (HPN process ID interval)} modulo (number of HARQ processes)+(HARQ process offset).

According to each aspect of the present disclosure, the HARQ process ID interval may be determined based on a number of transmission occasions in the period.

According to each aspect of the present disclosure, the HARQ process ID interval may be determined based on a number of repeated transmissions related to the configured UL configuration.

According to each aspect of the present disclosure, information on the HARQ process ID interval may be provided to the UE by the BS.

The foregoing solutions are merely a part of the examples of the present disclosure and various examples into which the technical features of the present disclosure are incorporated may be derived and understood by persons skilled in the art from the following detailed description.

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
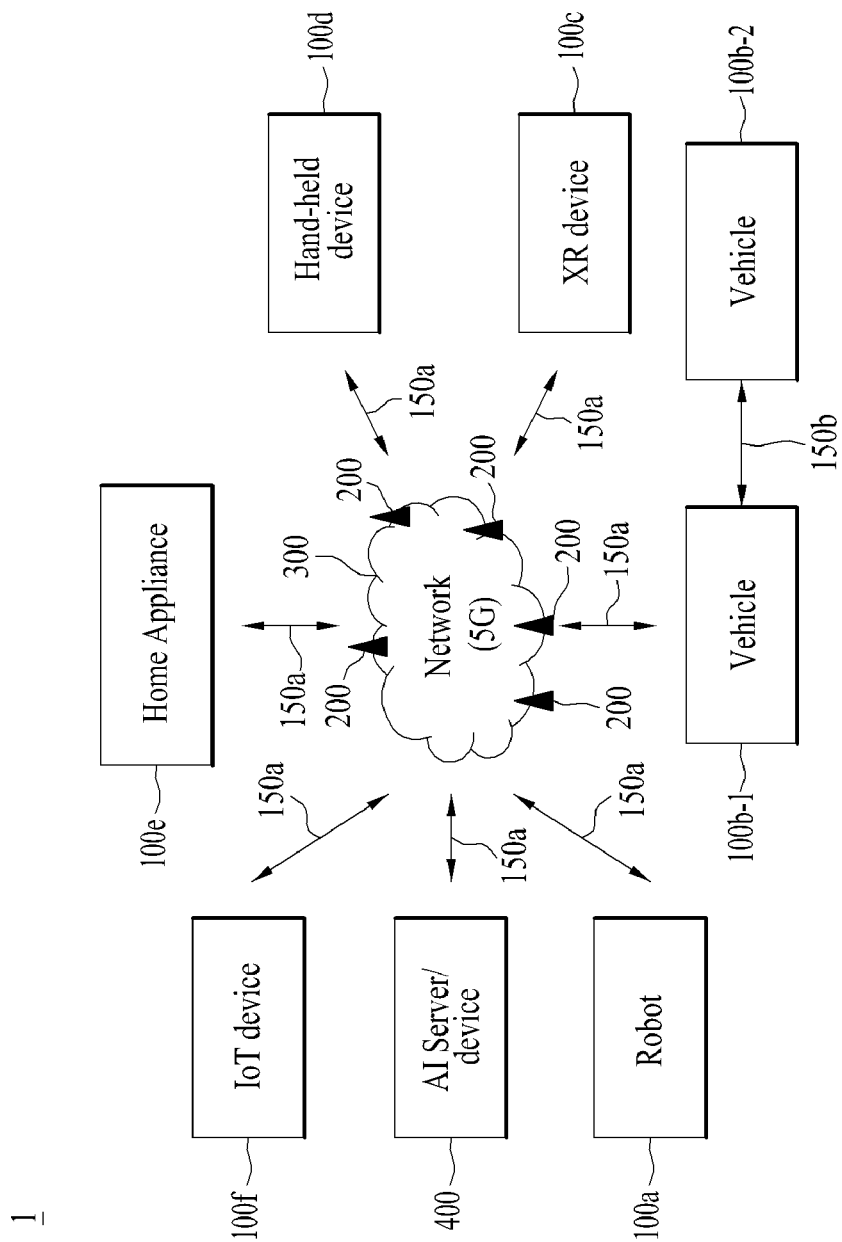
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, and 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related to the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more S cells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related uplink control information (UCI) is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined In the present disclosure, the PDCCH refers to a set of time-frequency resources (e.g., resource elements (REs)) that is a set of REs that carry downlink control information (DCI), and the PDSCH refers to a set of time-frequency resources that is a set of REs that carry DL data. The PUCCH, PUCCH, and PRACH refer to a set of time-frequency resources that is a set of time-frequency REs that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver or select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, not receiving physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150*b* (or, device-to-device (D2D) communication) may be established by various RATs (e.g., 5G NR). The wireless devices and the BSs/wireless devices may transmit/receive radio signals to/from each other through the wireless communication/connections 150*a* and 150*b*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
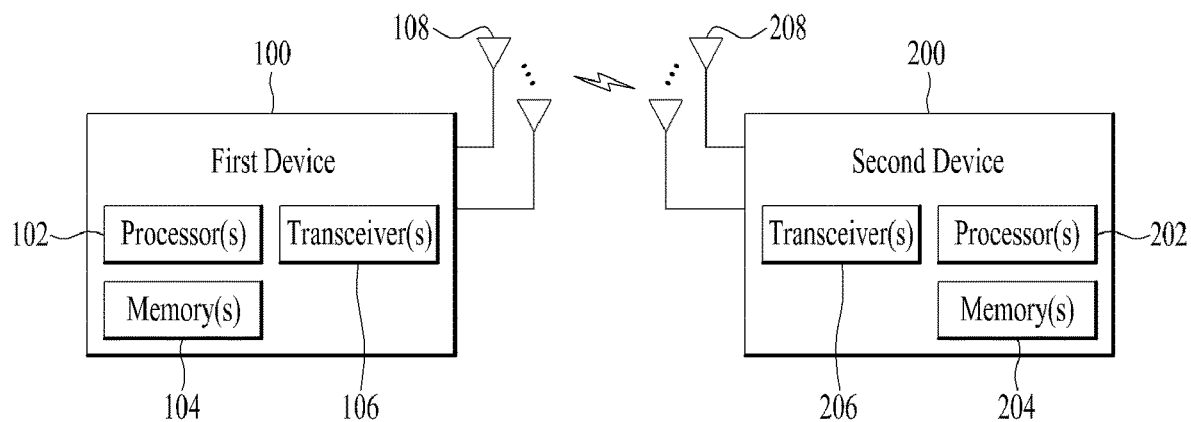
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100*x* and the BS 200} and/or {the wireless device 100*x* and the wireless device 100*x*} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the after-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the after-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the after-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the after-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, LTE non-Bandwidth Limited (non-BL), 5) LTE-MTC, 6) LTE Machine Type Communication, and/or 7) LTE M, etc., but the LTE-M technology is not limited to the above names Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
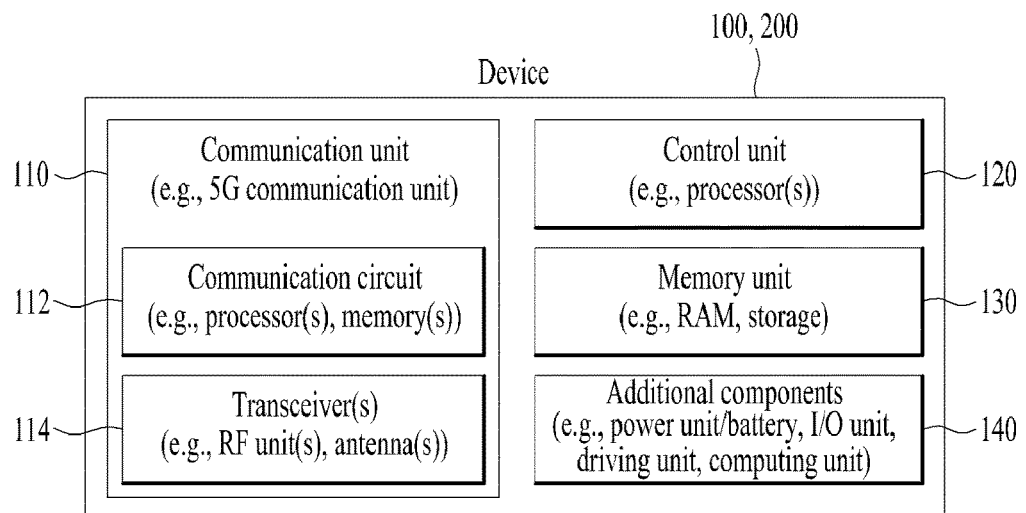
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable (non-transitory) storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one memory. The at least one computer memory may store instructions or programs which, when executed, cause the at least one processor operably coupled to the at least one memory to perform operations according to some embodiments or implementations of the present disclosure.

In the present disclosure, a computer program may include a program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor, and at least one computer memory operably connectable to the at least one processor and configured to store instructions for causing, when executed, the at least one processor to perform operations according to example(s) of the present disclosure described later.

Figure 4:
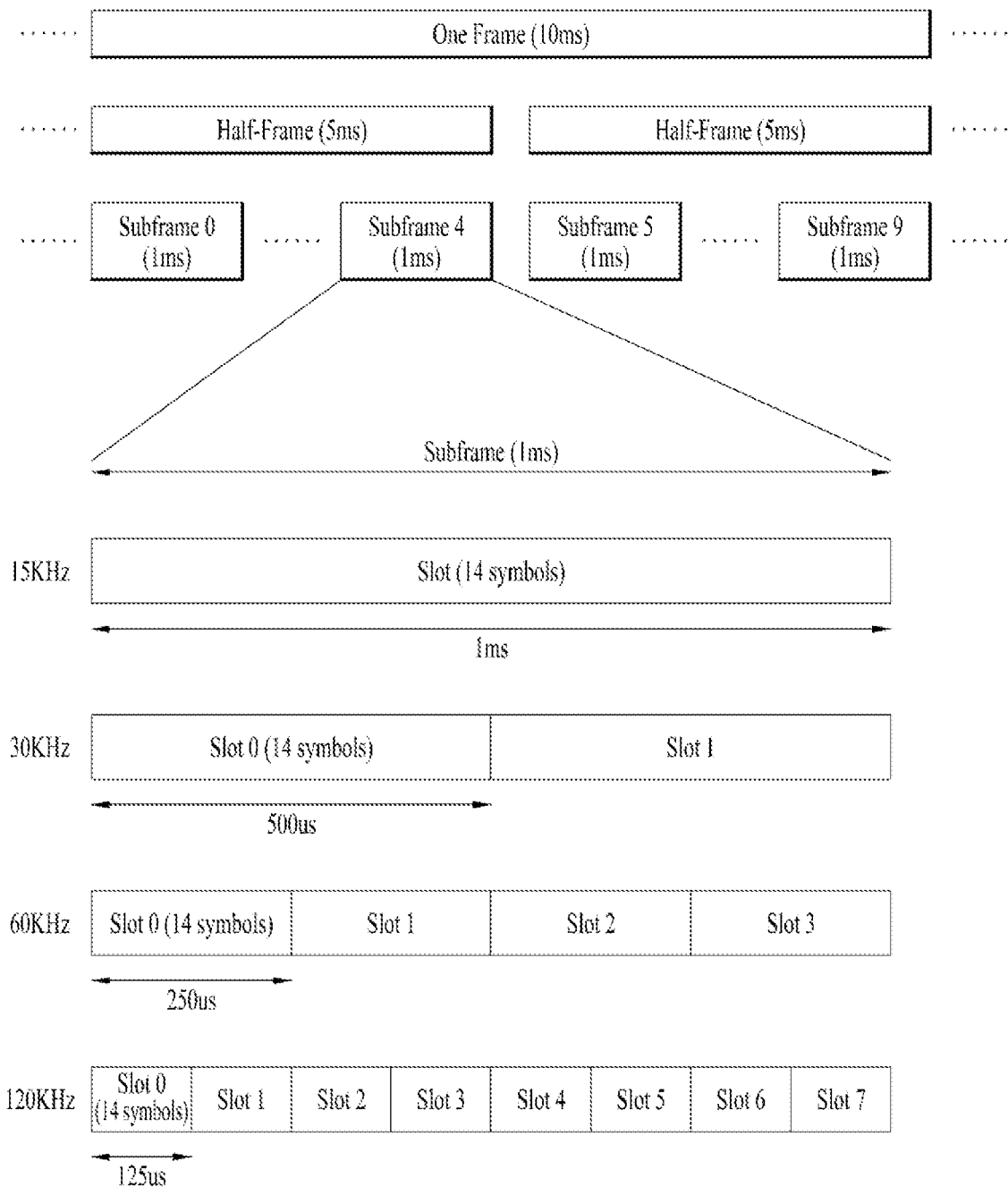
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| μ | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| μ | $N^{slot}_{symb}$ | $N^{frame,u}_{slot}$ | $N^{subframe,u}_{slot}$ |
|---|---|---|---|
| 2 | 12 | 40 | 4 |

For a search space configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
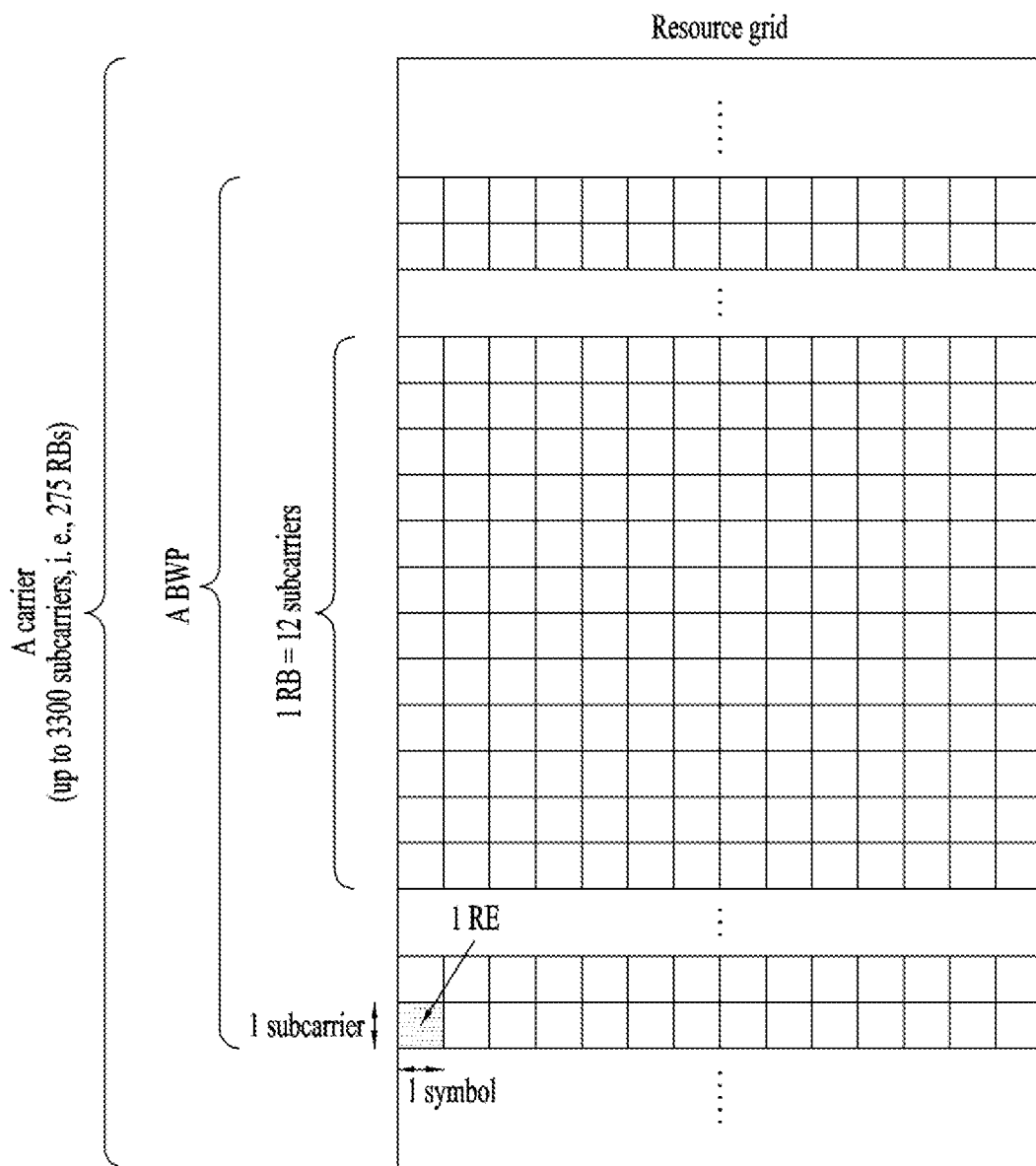
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB}=n^u_{CRB}+N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
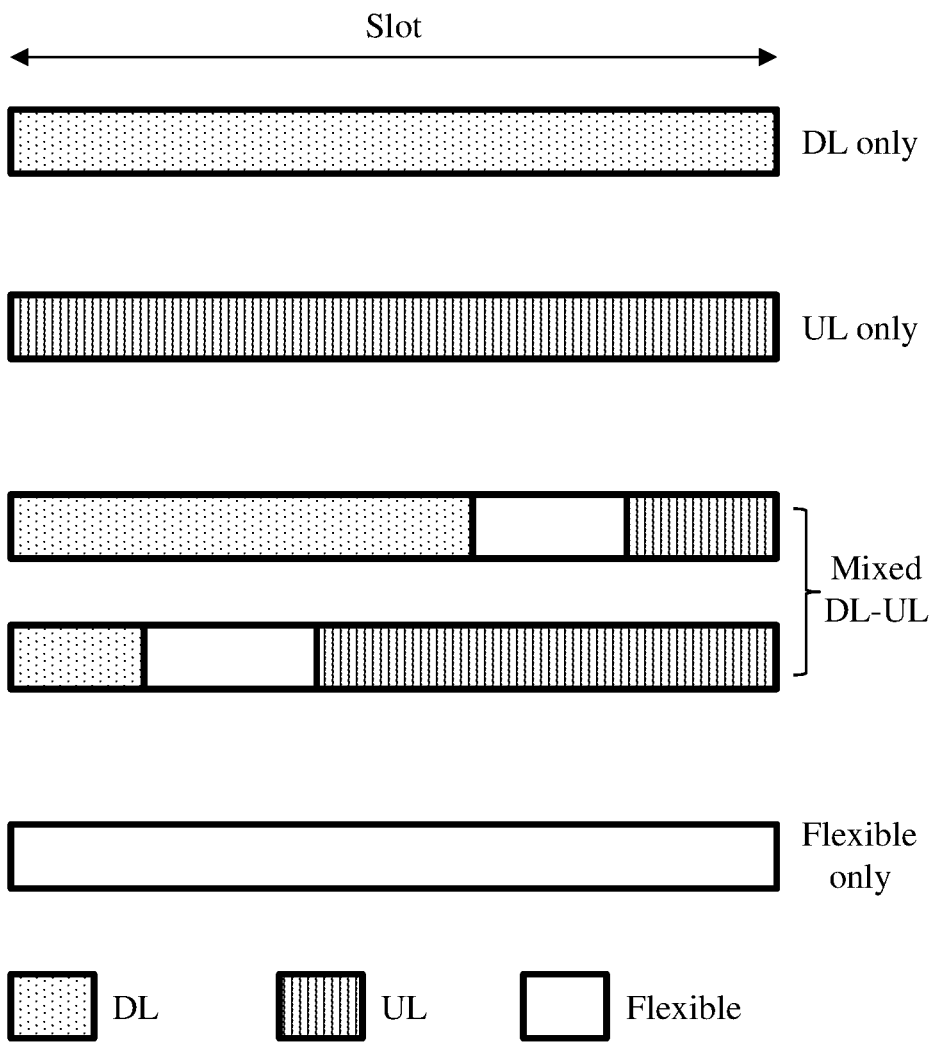
FIG. 6 illustrates slot structures available in a 3GPP based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data, Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;

nrofDownlinkSlots that provides the number of consecutive full DL slots at the beginning of each DL-UL pattern, where the full DL slots are slots having only DL symbols;

nrofDownlinkSymbols that provides the number of consecutive DL symbols at the beginning of a slot immediately following the last full DL slot;

nrofUplinkSlots that provides the number of consecutive full UL slots at the end of each DL-UL pattern, where the full UL slots are slots having only UL symbols; and nrofUplinkSymbols that provides the number of consecutive UL symbols in the end of a slot immediately preceding the first full UL slot The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |

TABLE 3-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | ... | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an radio network temporary identifier (RNTI) used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHZ | 60, 120, 240 KHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH refers to a physical layer UL channel for UCI transmission. The PUCCH carries UCI. The UCI includes the following:

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH Format 0 (PF0 or F0)
Supported UCI payload size: up to K bits (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)
Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)
Supported UCI payload size: more than K bits (e.g., K=2)
Number of OFDM symbols constituting a single PUCCH: 1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.
Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.
Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N_{symb}^{PUCCH}$ | Number of bits | Usage | Etc. |
|---|---|---|---|---|
| 0 | 1-2 | -<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing |
| 4 | 4-14 | >2 | HARQ, CSI, [SR] | DFT-s-OFDM (Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2
PUCCH resource set #1, if 2<the number of UCI bits=<$N_1$
PUCCH resource set #(K−1), if $N_{K-2}$<the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 5).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured. UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.
Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information for a DL-SCH or a UL-SCH may include a new data indicator (NDI), a transport block size (TBS), a redundancy version (RV), and a HARQ process ID (i.e., a HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
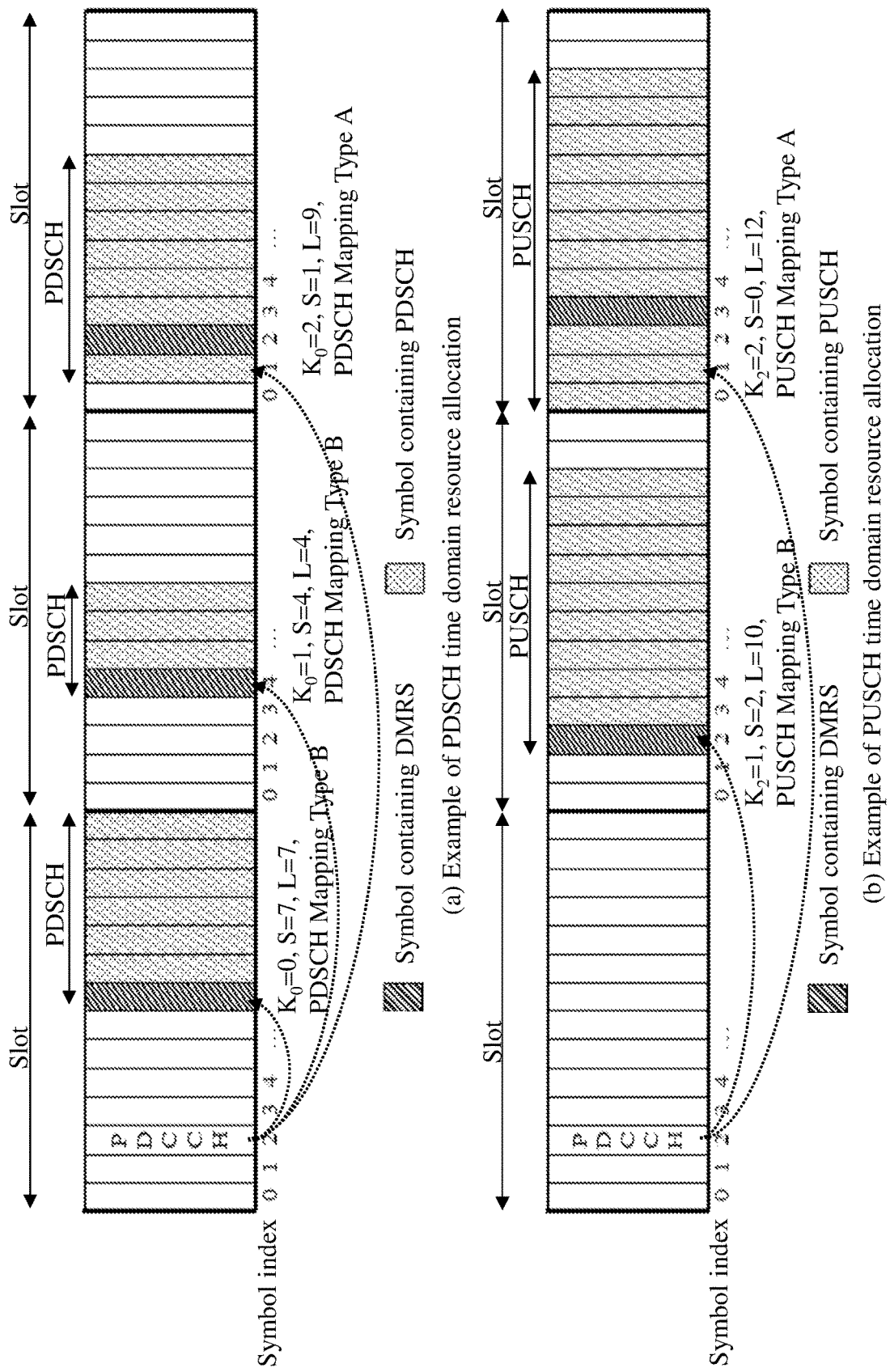
FIG. 7 illustrates an example of physical downlink shared channel (PDSCH) time domain resource allocation (TDRA) caused by a physical downlink control channel (PDCCH) and an example of physical uplink shared channel (PUSCH) TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
- cs-RNTI corresponding to a CS-RNTI for retransmission;
- periodicity corresponding to a periodicity of configured grant Type 1;
- timeDomainOffset indicating an offset of a resource with respect to system frame number (SFN)=0 in the time domain;
- timeDomainAllocation value m that provides a row index m+1 pointing to the allocation table, indicating a combination of the start symbol S, the length L, and the PUSCH mapping type;
- frequencyDomainAllocation that provides frequency domain resource allocation; and
- mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
 cs-RNTI corresponding to a CS-RNTI for activation, deactivation, and retransmission; and
 periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:
[(SFN*numberOfSlotsPerFrame*numberOfSymbolsPerSlot)+(slot number in the frame*numberOfSymbolsPerSlot)+symbol number in the slot]=[(SFN$_{start\ time}$*numberOfSlotsPerFrame*numberOfSymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$ and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, parameters harq-ProcID-Offset and/or harq-ProcID-Offset2 used to derive HARQ process IDs for configured uplink grants may be further provided to the UE by the BS. harq-ProcID-Offset may be an offset of a HARQ process for the configured grant for an operation with shared spectrum channel access, and harq-ProcID-Offset2 may be offset of an HARQ process for the configured grant. In the present disclosure, cg-RetransmissionTimer is a duration during which the UE needs not automatically perform retransmission using an HARQ process of the (re)transmission after (re)transmission based on the configured grant and is a parameter to be provided to the UE by the BS when retransmission is configured on the configured uplink grant. For grants in which harq-ProcID-Offset and cg-RetransmissionTimer are not configured, a HARQ process ID associated with a first symbol of UL transmission may be derived from the following equation: HARQ Process ID=[floor (CURRENT_symbol/periodicity)] modulo nrofHARQ-Processes. For uplink grants in which harq-ProcID-Offset2 is configured, a HARQ process ID associated with the first symbol of UL transmission may be derived from the following equation: HARQ Process ID=[floor(CURRENT_symbol/periodicity)] modulo nrofHARQ-Processes+harq-ProcID-Offset2, where CURRENT_symbol=(SFN*numberOfSlotsPerFrame*numberOfSymbolsPerSlot+slot number in the frame*numberOfSymbolsPerSlot+symbol number in the slot), and numberOfSlotsPerFrame and numberOfSymbolsPerSlot are the number of consecutive slots per frame and the number of consecutive OFDM symbols per slot. For the UL grants configured with cg-RetransmissionTimer, the UE may select an HARQ process ID from among HARQ process IDs available for grant configuration arbitrarily configured.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;
 nrofHARQ-Processes that provides the number of HARQ processes for SPS;
 periodicity that provides a periodicity of configured DL assignment for SPS; and
 n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured downlink assignments may be further provided to the UE by the BS. harq-ProcID-Offset may be an offset of a HARQ process for SPS. For configured downlink assignments without harq-ProcID-Offset, a HARQ process ID associated with a slot in which DL transmission starts may be determined from the following equation: HARQ Process ID=[floor (CURRENT_slot*10/(numberOfSlotsPerFrame* periodicity))] modulo nrofHARQ-Processes, where CURRENT_slot=[(SFN*numberOfSlotsPerFrame)+slot number in the frame], and numberOfSlotsPerFrame means the number of consecutive slots per frame. For configured downlink assignments with harq-ProcID-Offset, a HARQ process ID associated with a slot in which DL transmission starts may be determined from the following equation: HARQ Process ID=[floor (CURRENT_slot/periodicity)] modulo nrofHARQ-Processes+harq-ProcID-Offset, where CURRENT_slot=[(SFN*numberOfSlotsPerFrame)+slot number in the frame] and numberOfSlotsPerFrame means the number of consecutive slots per frame.

If the CRC of a corresponding DCI format is scrambled with the CS-RNTI provided by the RRC parameter cs-RNTI and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 6 and Table 7. Table 6 shows an example of special fields for DL SPS and UL grant Type 2 scheduling activation PDCCH validation, and Table 7 shows an example of special fields for DL SPS and UL grant Type 2 scheduling release PDCCH validation.

TABLE 6

|  | DCI format 0_0/0_1 | DCI format 1_0 | DCI format 1_1 |
| --- | --- | --- | --- |
| HARQ process number | set to all '0's | set to all '0's | set to all '0's |

TABLE 6-continued

| | DCI format 0_0/0_1 | DCI format 1_0 | DCI format 1_1 |
|---|---|---|---|
| Redundancy version | set to '00' | set to '00' | For the enabled transport block: set to '00' |

TABLE 7

| | DCI format 0_0 | DCI format 1_0 |
|---|---|---|
| HARQ process number | set to all '0's | set to all '0's |
| Redundancy version | set to '00' | set to '001 |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 8:
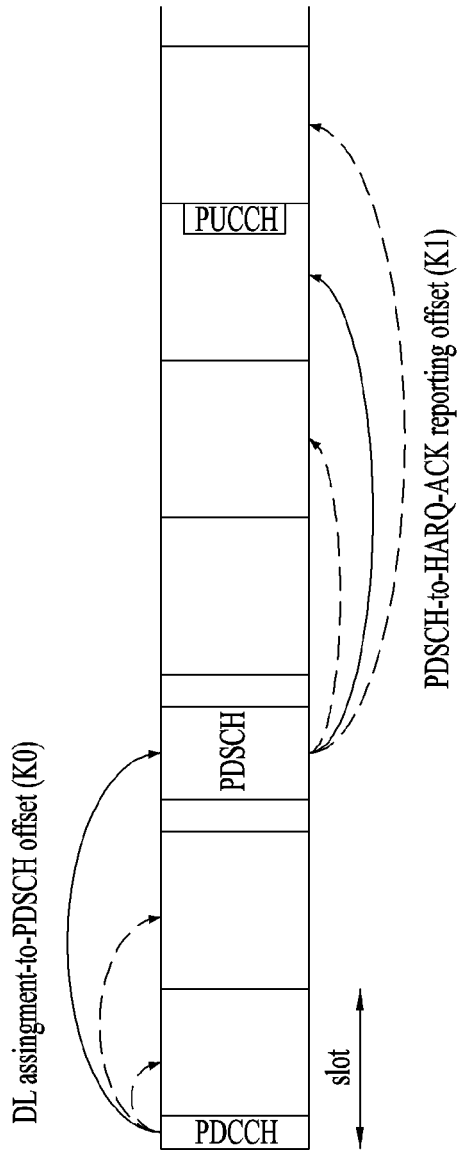
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.
FDRA: FDRA indicates an RB set allocated to the PDSCH.
TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.
PDSCH-to-HARQ_feedback timing indicator. This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK liming information in the DL grant DCI (PDCCH) for scheduling the PDSCH indicates k, the HARQ-ACK information for the PDSCH may be transmitted in slot #(m+k). As an example, k ∈ {1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n–k). For example, when k ∈ {1, 2, 3, 4, 5, 6, 7, 8}, the HARQ-ACK information of slot #n may include HARQ-ACK corresponding to slot #(n–8) to slot #(n–1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. For example, in the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A control resource set (CORESET), which is a set of time-frequency resources on which the UE is capable of monitoring a PDCCH, may be defined and/or configured. One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides the UE with parameters (e.g., CORESET #0) for monitoring a PDCCH for scheduling a PDSCH carrying system information block 1 (SIB1). The PBCH may indicate that there is no associated SIB1. In this case, the UE is informed of not only a frequency range within which it may be assumed that there is no SSB associated with SSB1 but also another frequency range within which the SSB associated with SIB1 is to be discovered. CORESET #0, which is a CORESET for scheduling at least SIB1, may be configured through either the MIB or dedicated RRC signaling.

A set of the PDCCH candidates monitored by the UE is defined in terms of PDCCH search space sets. A search space set may be common search space (CSS) set or UE-specific search space (USS) set. Each CORESET configuration is associated with one or more search space sets and each search space set is associated with one CORESET configuration. The search space set s is determined based on the following parameters provided by the BS to the UE.

controlResourceSetId: An indicator for identifying a CORESET p associated with the search space set s;
monitoringSlotPeriodicityAndOffset: A PDCCH monitoring periodicity of $k_s$ slots and a PDCCH monitoring offset of $o_s$ slots for configuring slots for PDCCH monitoring;
duration: a duration of $T_s<k_s$ slots indicating the number of slots in which the search space set s exists;
monitoringSymbolsWithinSlot: A PDCCH monitoring pattern in a slot, indicating the first symbol(s) of the CORESET in a slot for PDCCH monitoring;
nrofCandidates: The number of PDCCH candidates per control channel element (CCE) aggregation level; and
searchSpaceType: an indication that the search space set s is either a CCE set or a USS set.

The UE monitors PDCCH candidates only in PDCCH monitoring occasions. The UE determines the PDCCH monitoring occasions from a PDCCH monitoring periodicity, a PDCCH monitoring offset, and a PDCCH monitoring pattern in a slot. Parameter monitoringSymbolsWithinSlot indicates, for example, the first symbol(s) for PDCCH monitoring in slots configured for PDCCH monitoring (e.g., refer to parameters monitoringSlotPeriodicityAndOffset and duration). For example, if monitoringSymbolsWithinSlot is 14 bit, the bit of monitoringSymbolsWithinSlot may represent 14 OFDM symbols of a slot, respectively, such that the most significant (left) bit represents the first OFDM symbol in the slot and the second most significant (left) bit represents the second OFDM symbol in the slot. For example, bit(s) set to 1 among the bit in monitoringSymbolsWithinSlot identify the first symbol(s) of the CORESET in the slot.

The UE monitors PDCCH candidates only on PDCCH monitoring occasions. The UE determines PDCCH monitoring occasions on an active DL BWP within a slot based on a PDCCH monitoring periodicity, a PDCCH monitoring offset, and a PDCCH monitoring pattern.

In some implementations, for the search space set s, the UE may determine that PDCCH monitoring occasion(s) exist in a slot numbered $n^u_{s,f}$ within a frame numbered $n_f$ if $(n_f * N^{frame,u}_{slot} + n^u_{s,f} - o_s) \mod k_s = 0$. That is, the UE monitors PDCCH candidates for the search space set s in $T_s$ consecutive slots, starting from slot $n^u_{s,f}$, but the UE does not monitor the PDCCH candidates for the search space set s in subsequent $k_s - T_s$ consecutive slots.

Table 8 below shows RNTIs and uses cases, which are associated with search space sets.

TABLE 8

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTL, or MCS-C-RNTI, or CS-RNTI(S) | User specific PDSCH decoding |

The following table shows DCI formats which are capable of being carried by a PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UB may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a transport block (TB)-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. In the case of a CSS, DCI format 0_0 and DCI format 1_0 have a fixed size after a BWP size is initially given by RRC. In the case of a USS, in DCI format 0_0 and DCI format 1_0, the sizes of fields except for the size of a frequency domain resource assignment (FDRA) field have a fixed size, whereas the size of the FDRA field may be changed through a related parameter configuration by the BS. In DCI format 0_1 and DCI format 1_1, the sizes of DCI fields may be changed through various RRC reconfigurations by the BS. DCI format 2_0 may be used to provide dynamic slot format information (e.g., SFI DCI) to the UE, DCI format 2_1 may be used to provide DL pre-emption information to the UE, and DCI format 2_4 may be used to indicate a UL resource on which the UE needs to drop UL transmission.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a short scheduling time unit and a reliable transmission method.

A reference time unit assumed/used to transmit/receive a physical channel may vary among application fields or types of traffic. The reference time may be a basic unit for scheduling a specific physical channel, and the reference time unit may depend on the number of symbols and/or subcarrier spacing, and the like constituting the corresponding scheduling time unit. For simplicity, some embodiments/implementations of the present disclosure are described based on a slot or mini-slot as a reference time unit. A slot may be, for example, a basic unit for scheduling used for general data traffic (e.g., eMBB). A mini-slot may have a smaller time period than a slot in the time domain, and may be a basic unit for scheduling used in a special purpose or in a special communication scheme (e.g., URLLC, or unlicensed band or millimeter wave, etc.). However, embodiment(s)/implementation(s) of the present disclosure may be applied even in transmitting/receiving a physical channel based on the mini-slot for the eMBB service or transmitting/receiving a physical channel based on the slot for URLLC or other communication techniques.

For a service having strict latency and reliability requirements (e.g., URLLC service), the reliability of PUSCH/PDSCH transmission may need to be higher than that of the existing PUSCH/PDSCH transmission. In order to improve the reliability of PUSCH/PDSCH transmission, repeated transmission of PUSCH/PDSCH may be considered.

Figure 9:
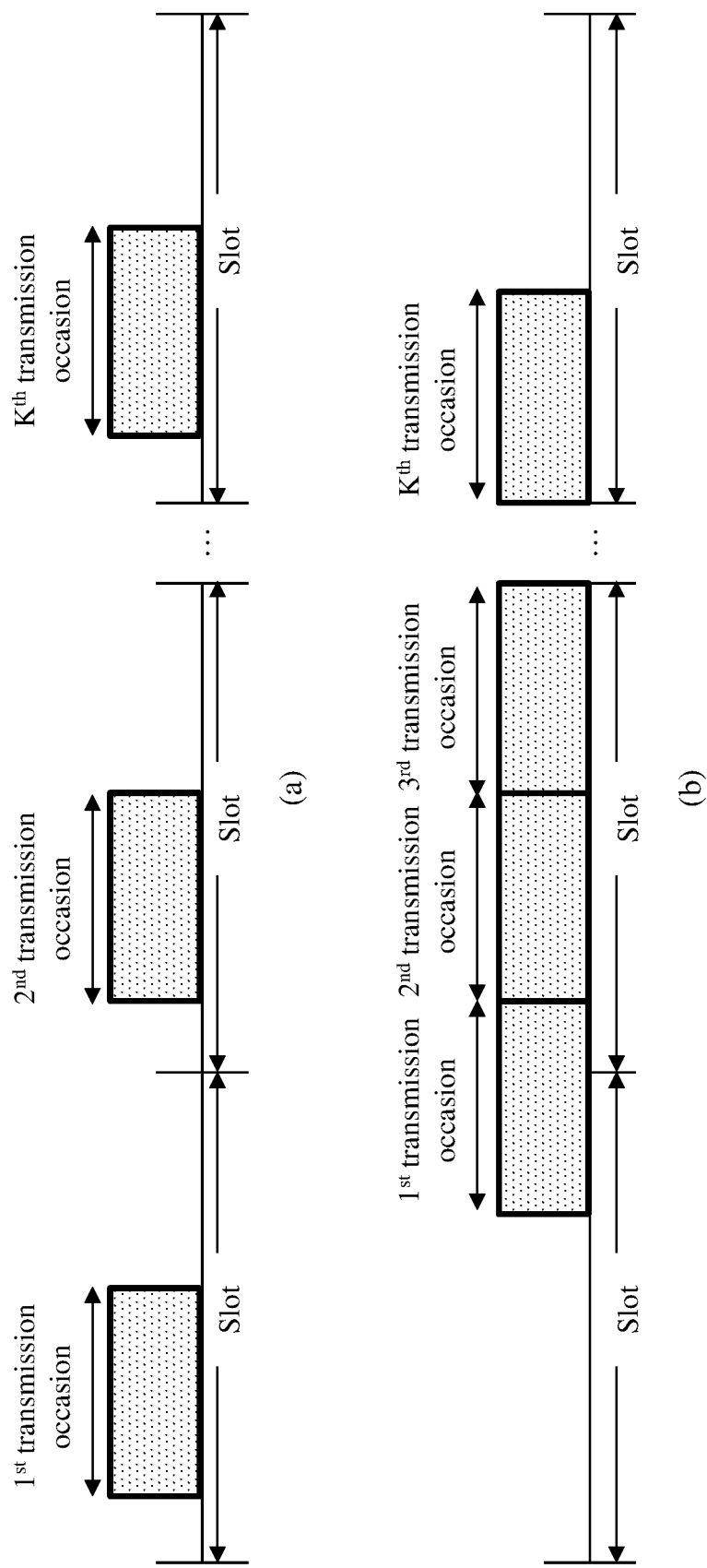
FIG. 9 illustrates types of repeated transmissions.

FIG. 9 illustrates types of repeated transmissions. Three types of repeated transmissions may be scheduled. In some implementations of the present disclosure, repetition of PUSCH/PDSCH may be applied to PUSCH/PDSCH transmission based on dynamic UL grant/DL assignment on PDCCH. The repetition of PUSCH/PDSCH may also be applied to transmission of PUSCH/PDSCH based on a configured grant. Repetitions to be applied to the PUSCH/PDSCH transmission may be indicated to or configured for the UE by the BS. For example, the UE may receive an indication of a repetition factor K through L1 signaling or a configuration thereof through higher layer signaling from the BS. Once the repetition factor K used to indicate the repetition number of the repeated transmission, or the like is indicated to or configured for the UE, the UE may repeat transmission/reception of a TB across K transmission/reception occasions. In the present disclosure, the repetition factor is also referred to as a repeated transmission factor The UE may be configured to perform multi-slot PUSCH transmission or multi-slot PDSCH reception. For example, referring to FIG. 9(a), the UE may be configured by the BS to apply the same symbol(s) allocation across K consecutive slots, where K is an integer greater than 1. In this case, the UE repeats transmission/reception of a TB across the K consecutive slots by applying the same slot(s) allocation in each of the K consecutive slots. In the present disclosure, an occasion on which a TB may be transmitted/received may be referred to as a transmission occasion/reception occasion. For example, when K PDSCH/PUSCH repetitions are indicated to the UE for the serving cell, the UE may perform PDSCH reception/PUSCH transmission in K consecutive DL slot(s)/subslot(s), starting in slot/subslot n. In this case, the UE may assume that all K PDSCH receptions/transmissions are performed in the same RB(s). In the present disclosure, the transmission occasion or the reception occasion is also referred to as a PUSCH (transmission) occasion in the case of a PUSCH and a PDSCH (transmission) occasion in the case of a PDSCH. Also, in the present disclosure, the transmission occasion is referred to as a transmission opportunity, and the reception occasion is referred to as a reception opportunity.

When the symbols of a slot allocated for PUSCH/PDSCH via a TDD UL-DL configuration by higher layer signaling and/or via SFI DCI are determined as downlink/uplink symbols, the UE omits transmission/reception in the slot for multi-slot PUSCH/PDSCH transmission/reception.

Hereinafter, PUSCH/PDSCH repetition performed by applying the same resource allocation across multiple consecutive slots is referred to as PUSCH/PDSCH repetition type A. In PUSCH/PDSCH repetition type A, when the UE receives resource allocation for wireless transmission from the BS, it may repeatedly use time-frequency resources defined in one slot on a slot-by-slot basis.

However, to cause the UE to perform PUSCH/PDSCH transmission/reception across multiple consecutive slots using the same resource allocation, the BS needs to secure the multiple consecutive slots. This may make flexible resource allocation difficult. In addition, when the BS intends to perform PDCCH transmission and PUSCH/PDSCH transmission in one slot, repetition of PUSCH/PDSCH for securing reliability may cause a large latency because only a few symbols of the latter half of the slot will be available as PUSCH/PDSCH transmission occasions. In the case of PUSCH/PDSCH transmission based on a configured grant, resource allocation for a TB may always be determined within one period of the configured grant. For example, a time duration for transmission of K repetitions for one TB may not exceed a time duration induced by the periodicity P of the configured grant. In some embodiments/implementations of the present disclosure, the UE may transmit/receive PUSCH/PDSCH according to a redundancy version (RV) sequence only at a predetermined position among a plurality of PUSCH/PDSCH resources for PUSCH/PDSCH repetition. For example, in some embodiments/implementations, when the configured RV sequence is {0, 2, 3, 1}, the UE starts the initial transmission of the TB on the first transmission occasion among K transmission occasions for K repetitions. In this case, a long time may need to be secured to secure the reliability of PUSCH/PDSCH transmission, or it may be difficult to configure a short periodicity using a plurality of PUSCH resources. In particular, when TB transmission is started in the middle of a plurality of PUSCH/PDSCH resources within a periodicity of the configured grant, that is, on an intermediate transmission occasion among the transmission occasions, it may be difficult to perform the repetition a sufficient number of times. Therefore, in the next radio access technology, it is being discussed to enable more flexible scheduling for URLLC by configuring resources regardless of slot boundaries or by repeatedly using resources on a symbol-by-symbol basis. For example, for more flexible and efficient resource utilization and service support and for faster and more robust UL/DL channel transmission, PUSCH/PDSCH may need to be repeated at an interval shorter than a slot, or resources for PUSCH/PDSCH repetition may need to be allocated regardless of the slot boundary, as illustrated in FIG. 9(b).

Referring to FIG. 9(b), the UE may be instructed or configured by the BS to perform PUSCH/PDSCH repetition back to back. Hereinafter, PUSCH/PDSCH repetition in which radio resources for PUSCH/PDSCH repetition are concatenated back to back in the time domain will be referred to as PUSCH/PDSCH repetition type B.

In some scenarios, it may be advantageous to periodically configure bursts of resources for repeated transmissions. For example, it may be advantageous that, for an SPS/CG configuration on an unlicensed band, once PDSCH/PUSCH transmissions are started for the UE, PDSCH/PUSCH occasions are assigned consecutively to prevent the UE from losing channel occupancy. In consideration of this, for example, to periodically allocate a burst of resources for CG-based PUSCHs, the BS may signal cg-nrofSlots providing the number of consecutive slots allocated within a configured CG grant period and cg-nrofPUSCH-InSlot providing the number of consecutive PUSCH allocations within a slot to the UE, a first PUSCH allocation among consecutive PUSCH allocations in a slot may follow the time domain allocation timeDomainAllocation for the CG grant, and the remaining PUSCH allocations may have the same length and PUSCH mapping type as the time domain allocation timeDomainAllocation and may be appended following previous assignments without a gap. The same combination of a start symbol, a length, and a PUSCH mapping type may repeat over the consecutively allocated slots.

In some implementations of the present disclosure, repetition may be classified into nominal repetition and actual repetition. The nominal repetition may be determined based on resource allocation provided to the UE by a DCI (hereinafter referred to as scheduling DCI) or a SPS/CG configuration for scheduling PUSCH/PDSCH transmission. For example, for PUSCH repetition type B, for the n-th nominal repetition, n=0, . . . numberOfRepetitions−1, i) a slot in which nominal repetition starts is given by $K_s+\text{floor}\{(S+n*L)/N^{slot}_{symb}\}$ and a starting symbol relative to start of the slot is given by $\text{mod}(S+n*L, N^{slot}_{symb})$, ii) a slot in which nominal repetition ends is given by $K_s+\text{floor}\{(S+(n+1)*L-1)/N^{slot}_{symb}\}$, and an ending symbol relative to start of the symbol is given by $\text{mod}(S+(n+1)*L-1, N^{slot}_{symb})$. Here, numberOfRepetitions may be the number of repetitions indicated or configured by the BS, Ks may be a slot in which PUSCH transmission starts, $N^{slot}_{symb}$ may be the number of symbols per slot, S and L may be given by time domain resource allocation (TDRA), S represents a start symbol relative to start of the slot, and L represents the number of consecutive symbols counted from the symbol S.

The actual repetition may be determined by applying the remaining elements(s) that is not considered to determine the nominal repetition. For example, a symbol indicated for downlink by RRC configuration tdd-UL-DL-Configuration-Common or tdd-UL-DL-ConfigurationDedicated may be regarded as an invalid symbol for PUSCH transmission, symbols indicated by ServingCellConfigCommon or ssb-PositionsInBurst in SIB1 for reception of SS/PBCH blocks may be considered as invalid symbols for PUSCH transmission, and symbol(s) indicated by pdcch-ConfigSIB1 in MIB for a CORESET for a Type0-PDCCH CSS set as a CSS for reception of system information may be considered as invalid symbol(s) for PUSCH transmission. When the UE is configured with a higher layer (e.g. RRC) parameter invalidSymbolPattern providing a symbol-level bitmap spanning one or more slots, a bit value of 1 in the symbol-level bitmap may indicate that the corresponding symbol is an invalid symbol for a PUSCH transmission.

After determining invalid symbol(s) for nominal repetitions, the remaining symbols may be considered as potentially valid symbols for the corresponding PUSCH transmission. If the number of potentially valid symbols is greater than zero for a nominal repetition, the nominal repetition may include one or more actual repetitions, each actual repetition may include a set of potentially valid consecutive symbols to be used for PUSCH transmission within a slot. Referring to FIG. 9 (b), the nominal repetition of the first transmission occasion may be divided into two actual repetitions with a slot as a boundary. If the nominal repetition is divided into sets of potentially valid consecutive symbols by an invalid symbol, each of the sets of potentially valid consecutive symbols may be an actual repetition.

In the present disclosure, the nominal repetition of a PUSCH may be referred to as a nominal PUSCH, and the actual repetition of a PUSCH may be referred to as an actual PUSCH.

As mentioned in the previous description of configured downlink assignments and configured uplink grants, in some scenarios, one HARQ process ID may be determined in a HARQ process pool configured for the configured downlink assignments and the configured uplink grants through an index of a starting OFDM symbol of a resource that is periodically simply repeated. Alternatively, in some scenarios, it is possible for the UE to select one HARQ process ID from the configured HARQ process pool as needed and to inform the BS of the selected HARQ process ID during PUSCH transmission by piggybacking the selected HARQ process ID on PUSCH transmission. However, the periodically simply repeated resource may be inefficient for complex or deterministic traffic patterns. In particular, in the case of scenarios in which one HARQ process ID is determined for each period for the configured grant/assignment, only a single transport block (TB) for each period may be supported, and the BS is not capable of determining whether transmission performed by the UE is retransmission of previous transmission or new transmission unless the configured grant UCI (CG-UCI) to the UE is not configured to the UE, and thus autonomous retransmission is not supported with the configured grant/assignment. In addition, a method of piggybacking the HARQ process ID during PUSCH transmission and notifying the BS not only reduces the reliability of UL-SCH transmission, but also requires the UE to separately encode and transmit the HARQ process ID, which may be an additional burden on UE implementation. As a result, this burden may cause the UE to miss some of UCI such as HARQ-ACK feedback, scheduling request, and channel state information.

In the present disclosure, a method of informing the BS of the HARQ process ID of PUSCH transmission while minimizing an impact of the UE on the reliability of UL-SCH transmission within a given resource pattern, and a method of deterministically determining a HARQ process ID in a given resource pattern are described. In the present disclosure, a HARQ process ID determination method to be used not only for periodically simply repeated resources but also for periodically repeated resource patterns is described.

In Terms of UE:

First, the implementations of the specification are described in terms of a UE.

Figure 10:
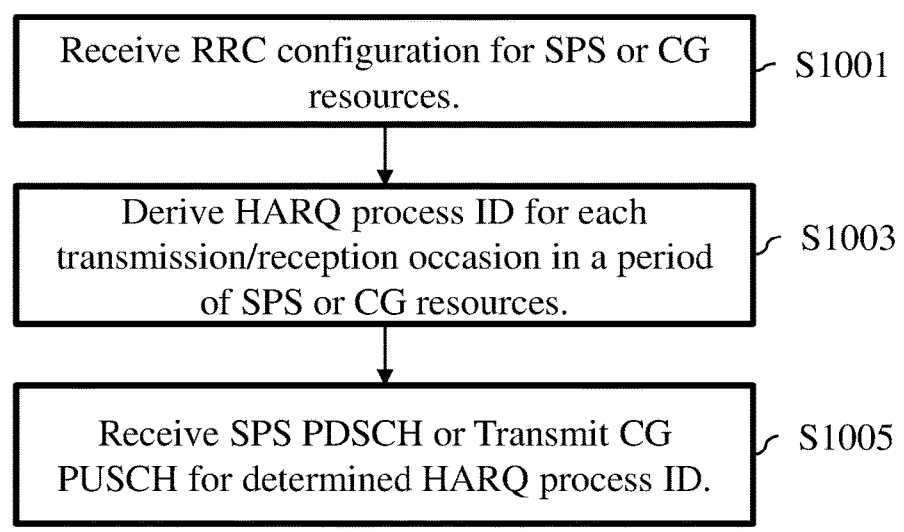
FIG. 10 shows an example of a channel transmission flow in a UE according to some implementations of the present disclosure.

FIG. 10 shows an example of a channel transmit/receive flow in a UE according to some implementations of the present disclosure.

When the UE is allocated an SPS/CG resource from a BS and performs reception or transmission based on the allocated SPS/CG resource, a HARQ process ID to be used at an SPS/CG occasion in which the UE performs reception or transmission may be determined through implementations of the present disclosure. An example of a UE operation according to some implementations of the present disclosure will be described.

The UE receives RRC parameter(s) for SPS or CG resources from the BS (S1001). For example, the UE may receive an SPS configuration or a CG configuration from the BS through RRC signaling.

The UE may receive activation DCI for the SPS/CG resource configured from the BS. Receiving the activation DCI may be omitted according to the SPS/CG resource configuration. For example, when the UE uses a Type 1 CG resource, receiving the activation DCI may be omitted.

The UE may determine an SPS reception occasion or a CG transmission occasion based on the activation DCI and/or RRC parameter(s) for the SPS/CG resource (i.e., SPS/CG configuration).

If there are multiple transmission occasions/reception occasions for one or more transport blocks (TBs) within a specific period, the UE may determine a set of HARQ process IDs to be used in one period, that is, a HARQ process pool based on the configured RRC parameter(s) and the activation DCI.

The UE may determine a HARQ process ID for each reception/transmission occasion based on the HARQ process pool in order to receive and transmit SPS/CG in the specific period (S1003).

Through the determined HARQ process ID, the UE may receive an SPS PDSCH or transmit a CG PUSCH (S1005).

In some implementations of the present disclosure, the following UE operation may be considered. In the present disclosure, the UE operations are described based on uplink transmission using a grant mainly configured for convenience of explanation, but implementations of the present disclosure are not limited thereto. As an example, implementations of the present disclosure may also be applied to downlink SPS. When implementations of the present disclosure are applied to downlink SPS, the BS may perform an SPS-based transmission operation and the UE may perform an SPS-based reception operation.

<Implementation A1> UE Selects and Reports HARQ Process ID from Entire HARQ Process Pool A UE may determine which HARQ process ID to use for each transmission within a range of the configured HARQ process IDs and report the determined HARQ process ID to the BS along with the corresponding PUSCH transmission. The range of configured HARQ process IDs may be determined based on CG parameter(s). For example, the BS may configure a starting HARQ process ID X and the number N to be used through the corresponding CG configuration, and thus the UE may be configured to use the HARQ process ID in a range of [X, X+N−1].

In order for the UE to report the selected HARQ process ID to the BS, the UE may separately encode the HARQ process ID or transmission parameters (e.g., HARQ process ID, NDI, MCS and/or RV) including the HARQ process ID and may transmit the encoded information via a PUSCH along with the UL-SCH. In this case, a conventional method in which a UE transmits required UCI (e.g., HARQ process ID, redundancy version (RV), new data indicator (NDI), and channel occupancy time sharing information) with a UL-SCH on a CG-based PUCSH in an unlicensed band may be used. For example, in some implementations of the present disclosure, the UE may transmit HARQ process ID, RV, NDI, MCS, and/or channel occupancy time sharing information along with UL-SCH, that is, uplink data, on the CG-based PUSCH.

In some scenarios, PUSCH repetition type B may be used to support flexible resource allocation. When PUSCH repetition type B is indicated or configured to the UE, the UE may repeat one PUSCH scheduling with K nominal repetitions based on a given repeated transmission factor K, and may consider the following for implementation A1 when each nominal PUSCH in uplink is divided into K' actual repetitions in consideration of invalid symbol(s) and a slot boundary.

<Implementation A1-1>

In implementation A1, a HARQ process ID or a transmission parameter including the HARQ process ID may be separately encoded and transmitted together only for first actual repetition. In implementation A1-1, the HARQ process ID may be transmitted on actual repetition for transmitting UCI such as other HARQ-ACK feedback, SR, and CSI, and thus a UL-SCH, UCI, and the HARQ process ID may be transmitted together on the same PUSCH as much as possible. This may simplify an operation of the BS by reducing the number of PUSCH de-multiplexing of the BS and may cause the BS to recognize whether the corresponding repeated transmission is first repeated transmission among repeated transmissions depending on whether the repeated transmission includes a HARQ process ID to be separately decoded.

<Implementation A1-2>

In implementation A1, a HARQ process ID or a transmission parameter including the HARQ process ID may be separately encoded and transmitted together for all actual repetitions. In implementation A1-2, even if the BS fails to receive specific PUSCH repetition, the BS may recognize a HARQ process ID related to the corresponding PUSCH transmission based on transmission parameters included in other PUSCH repetitions. In implementation A1-1, when a PUSCH carrying the HARQ process ID is not properly received, there is a risk that the BS misidentifies a HARQ process and combines the corresponding transmission in HARQ process buffers with different HARQ process IDs. In order to avoid the problem of implementation A1-1, implementation A1-2 may be used.

<Implementation A1-3>

In implementation A1, a HARQ process ID or a transmission parameter including the HARQ process ID may be transmitted together only in PUSCH repetitions that satisfy a specific condition (or do not satisfy a specific condition). For example, implementation A1 may be used for a PUSCH that satisfies the following conditions.

The UE may not include the HARQ process ID and transmission parameters in the PUSCH having a transmission time length of X symbols or less. Here, X may be 1. This is to minimize UCI included in the PUSCH and maximize radio resources to be used for a UL-SCH among the radio resources of the PUSCH. Accordingly, the UL-SCH may be transmitted in limited resource element(s) of a short PUSCH. The UE may not include the HARQ process ID and transmission parameters in the PUSCH in which the number of REs used for UL-SCH transmission is X or less. X*M/TBS=C, where M is a modulation order, TBS is a transport block size, and C is a code rate. C may be 1 or a value obtained by multiplying a code rate given from MCS by a real number less than 1.

<Implementation A2> UE Selects (and Reports) HARQ Process ID from Sub-HARQ Process Pool A UE may determine a range of HARQ process IDs to be used for each period. Which HARQ process ID is to be used for each transmission within the corresponding range of HARQ process IDs may be determined and reported to the BS along with PUSCH transmission. The range of HARQ process IDs within each period may be determined based on CG parameter(s). For example, a starting HARQ process ID X to be used in each period and the number N of HARQ process IDs to be used in each period may be determined based on the CG parameter(s). Through this, the HARQ process ID to be used in a specific period may be determined in a range of [X, X+N−1].

Figure 11:
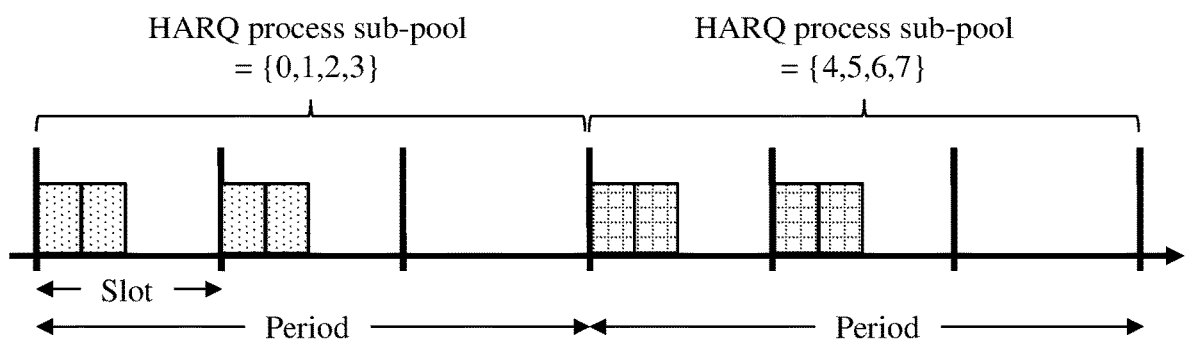
FIG. 11 shows an example of a HARQ process range (i.e., sub-pool) configured for periods according to some implementations of the present disclosure.

FIG. 11 shows an example of a HARQ process range (i.e., sub-pool) configured for periods according to some implementations of the present disclosure. FIG. 11 shows an example of a PUSCH occasion and a corresponding HARQ process sub-pool according to CG-based PUSCH configuration in which periodicity is three slots, the number of consecutive slots cg-nrofSlots used for PUSCH transmission(s) per period is 2, and the number of PUSCH transmission(s) per slot cg-nrofPUSCH-InSlot is configured to 2. In particular, FIG. 11 shows an example of CG-based transmission occasions in which HARQ process IDs with a range of {0,1,2,3} and HARQ process IDs with a range of {4,5,6,7} are determined for respective periods. According to implementation A2, different HARQ process pools may be used in periods, as shown in FIG. 11.

In implementation A2, a starting HARQ process ID X to be used in each period and the number N of HARQ process IDs in each period may be determined through the following method(s).

<Implementation A2-1>

A starting HARQ process ID to be used in each period may be determined through the following equation: {floor (symbol index/periodicity)*(HPN interval)} modulo nrof-HARQ-Processes+harq-ProcID-Offset. Alternatively, a starting HARQ process ID to be used in each period may be determined through the following equation: {ceil(symbol index/periodicity)*(HPN interval)} modulo nrofHARQ-Processes+harq-ProcID-Offset.

In the above equation, "symbol index" denotes a symbol index, that is, the number of symbols to a start symbol of a first PUSCH occasion in a period from SFN=0, and the symbol index may be represented using the following equation: symbol index=(SFN*numberOfSlotsPerFrame*numberOfSymbolsPerSlot+slot number in the frame*numberOfSymbolsPerSlot+symbol number in the slot), and here, numberOfSlotsPerFrame and numberOfSymbolsPerSlot refer to the number of consecutive slots per frame and the number of consecutive OFDM symbols per slot (refer to 3GPP TS 38.211).

In the above equation, periodicity is a symbol length of a period configured for an SPS/CG resource in one SPS/CG configuration (i.e., the number of symbols included in the configured period).

In the above equation, nrofHARQProcesses is the number of available HARQ process(s) configured for an entire SPS/CG resource in one SPS/CG configuration.

In the above equation, harqProcIDOffset is a parameter value configured to determine the starting HARQ process ID of the available HARQ process(s). nrofHARQProcesses HARQ processes from a HARQ process with a HARQ process ID of harqProcIDOffset may be sequentially used as the available HARQ process(s).

In the above equation, a HPN interval, that is, a HARQ processor number interval may be a minimum difference between starting HARQ process IDs to be used in different periods. In some implementations of the present disclosure, the HPN interval may be determined through at least one of the following.

The number of PUSCH transmission occasions (e.g., nominal PUSCH occasions) in a period (or the number of actual PUSCHs). Repeated PUSCH transmission may be configured through one or more parameters, such as the number of PUSCH repetitions per slot (e.g., cg-nrofPUSCH-InSlot) and the number of slot repetitions (e.g., cg-nrofSlots). In this case, the number of PUSCH transmission occasions finally created by the corresponding parameters may be used as the HPN interval. For example, the HPN interval may be determined to be cg-nrofPUSCH-InSlot*cg-nrofSlots, which is the product of the two parameters cg-nrofSlots and cg-nrofPUSCH-InSlot.
  The indicated or configured number of repeated transmissions (e.g., RepK) of a CG PUSCH (or the number of nominal PUSCHs). When the indicated or configured number of repeated transmissions and the number of PUSCH transmission occasions in a period are different, ceil{(number of PUSCH transmission occasions in a period)/(indicated or configured number of repeated transmissions)} or floor{(number of PUSCH transmission occasions)/(indicated or configured number of repeated transmissions)} may be used as the HPN interval. This allows one HARQ process ID to have as many PUSCH transmission occasions as the indicated or configured number of repeated transmissions within a period. For example, among PUSCH occasions within a period, at least as many PUSCH occasions as the indicated or configured number of repeated transmissions may be related to one HARQ process ID.
  L1 signaling by BS (e.g., DCI over PDCCH), or higher layer signaling.

<Implementation A2-2>

The number N of HARQ process IDs to be used in each period may be determined through at least one of the following.

An HPN interval value determined in implementation A2-1 is used.
  When the HPN interval value determined in implementation A2-1 is not used, a HPN value is determined using the same method as the method used to determine the HPN interval value in implementation A2-1. For example, N may be determined through at least one of the following.
  The number of PUSCH transmission occasions in a period (or the number of actual PUSCHs). Repeated PUSCH transmission may be configured through one or more parameters, such as the number of PUSCH repetitions per slot (e.g., cg-nrofPUSCH-InSlot) and the number of slot repetitions (e.g., cg-nrofSlots). In this case, the number of PUSCH transmission occasions finally created by corresponding parameters may be used as the HPN interval. For example, the HPN interval may be determined to be cg-nrofPUSCH-InSlot*cg-nrofSlots, which is the product of the two parameters cg-nrofSlots and cg-nrofPUSCH-InSlot.

The indicated or configured number of repeated transmissions (e.g., RepK) of a CG PUSCH (or the number of nominal PUSCHs). When the indicated or configured number of repeated transmissions and the number of PUSCH transmission occasions in a period are different, ceil{(number of PUSCH transmission occasions in a period)/(indicated or configured number of repeated transmissions)} or floor{(number of PUSCH transmission occasions)/(indicated or configured number of repeated transmissions)} may be used as the HPN interval. This allows one HARQ process ID to have as many PUSCH transmission occasions as the indicated or configured number of repeated transmissions within a period. For example, among PUSCH occasions within a period, at least as many PUSCH occasions as the indicated or configured number of repeated transmissions may be related to one HARQ process ID.

L1 signaling by BS, or higher layer signaling.

<Implementation A2-3>

The UE may determine which HARQ process ID to use for each PUSCH transmission of the corresponding period within a range of HARQ process IDs determined in a specific period and report the determined information to the BS along with PUSCH transmission.

In order to transmit the HARQ process ID selected by the UE to the BS, the UE may separately encode the HARQ process ID or transmission parameters including the HARQ process ID (e.g., HARQ process ID, NDI, and/or MCS) and transmit the encoded information via the PUSCH together with a UL-SCH. In this case, a conventional method in which a UE transmits a CG-UCI on a PUCSH in an unlicensed band and/or implementation A1 may be used. For example, in some implementations of the present disclosure, the UE may transmit HARQ process ID, RV, NDI, MCS, and/or channel occupancy time sharing information along with a UL-SCH, that is, uplink data on a CG-based PUSCH.

<Implementation A2-4>

In implementation A2, the UE may assume that a HARQ process ID within a range of HARQ process IDs determined in a specific period is mapped to each PUSCH transmission in the corresponding period. When a starting HARQ process ID of a period determined through implementation A2 is X and the number of HARQ process IDs in a period is N, an n-th PUSCH occasion in time within the corresponding period may have the following HARQ process ID: HARQ process ID for n-th PUSCH occasion=X+mod(n−1, N). Here, the starting HARQ process ID X of each period may be determined according to implementation A2-1, and the number N of HARQ process IDs for each period may be determined according to implementation A2-2.

Figure 12:
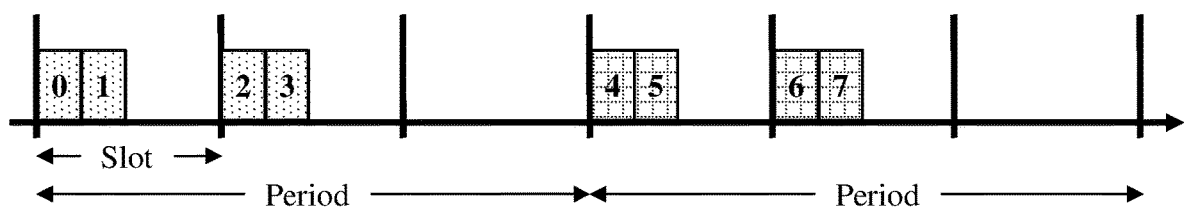
FIG. 12 shows an example of HARQ process IDs mapped to PUSCH occasions in each period.

FIG. 12 shows an example of HARQ process IDs mapped to PUSCH occasions in each period. In particular, FIG. 12 shows an example of CG PUSCHs to which HARQ processes are mapped in the case in which HARQ process IDs {0,1,2,3} and HARQ process IDs {4,5,6,7} are for two periods, respectively.

<Implementation A3> HARQ Process ID Mapped at HPN Interval

In some implementations, a UE may sequentially use HARQ process IDs for respective periods in a range of HARQ process IDs determined based on parameter(s) included in an SPS/CG configuration. In this case, the minimum distance between PUSCH occasions having the same HARQ process ID may always be the same.

A UE communicating in an unlicensed band always has a risk of transmission failure, and in order to reduce problems that may arise from this risk, retransmission is performed on the configured CG PUSCH without receiving a PDCCH (for scheduling retransmission) separately. In this case, if a distance between PUSCH occasions having the same HARQ process ID is always the same, when transmission fails on a first CG PUSCH occasion, retransmission performed on a CG PUSCH suffers a delay.

In implementation A3, some HARQ process IDs may appear multiple times within a period, allowing the UE to quickly attempt two or more CG PUSCH transmissions within one period. According to implementation A3, the UE may transmit traffic for which reliability is important for an HARQ process ID having multiple transmission opportunities. Through this, it may be possible to minimize a risk due to Listen before talk (LBT) and/or Channel access procedure (CAP) failure that may occur in an unlicensed band.

For example, the UE may determine a starting HARQ process ID X to be used in each period, and determine a HARQ process ID to be used in each PUSCH transmission opportunity within the corresponding period. In this case, in order to determine the starting HARQ process ID X, a method of determining the HARQ process ID to be used for each period (refer to the HARQ process ID described in "Resource Allocation by RRC") may be used, or a method of determining the starting HARQ process ID described in implementation A2 may be used.

When the starting HARQ process ID of a determined period is X, the n-th PUSCH occasion in time within the corresponding period may have the following HARQ process ID: HARQ process for n-th PUSCH occasion=X+mod (K*(n−1), nrofHARQProcesses).

In the above equation, nrofHARQProcesses may refer to the number of available HARQ processes configured for all SPS/CG resources in one SPS/CG configuration.

In the above equation, K is an HPN interval, and the HPN interval is a minimum difference between HARQ process IDs to be used in different PUSCH occasions in one period. The HPN interval may be determined through at least one of the following.

Occasions of PUSCH transmission occasions within period (or the number of actual PUSCHs)

Indicated or configured number of repeated transmissions of a CG PUSCH (or the number of nominal PUSCHs). Repeated PUSCH transmission may be configured through one or more parameters, such as the number of PUSCH repetitions per slot and the number of slot repetitions. In this case, the number of repeated transmissions finally made by the corresponding parameters may be used as the HPN interval. For example, the product of two parameters (e.g., the number of PUSCH repetitions per slot and the number of slot repetitions) may be used as the HPN interval.

L1 signaling by BS, or higher layer signaling

<Implementation A4> Indicate UE-Centric Transmission Parameter

The UE may indicate to the BS a transmission parameter such as NDI and RV selected by the UE for PUSCH transmission. In this case, an orthogonal DMRS port may be used to indicate the transmission parameters to the BS.

When implementation A3 or implementation A2 is applied, the UE and BS may deterministically derive the HARQ process ID of each transmission occasion. However, in order to still perform UR-centric transmission such as autonomous retransmission, it may be necessary to separately encode transmission parameters such as NDI and RV and transmit the encoded information along with a UL-SCH on a PUSCH. This series of processes may impose an additional burden on UCI transmission of the UE. Therefore, it may be considered to minimize the amount of information of a transmission parameter required for UE-centric transmission and to express the transmission parameter using a DMRS or other reference signals transmitted along with the PUSCH instead of encoding and including the information separately to express the reduced amount of information.

By allowing the BS to reserve n DMRS ports for one UE and allowing the UE to select one of the DMRS ports, the UE may express n types of information. For example, the BS may reserve two DMRS ports for the UE, select a first DMRS port when the UE performs transmission with NDI=0, and select a second DMRS port when performing transmission with NDI=1. Alternatively, the first DMRS port may be selected when transmission in which NDI is toggled is performed, and the second DMRS port may be selected when transmission in which NDI is not toggled is performed.

The BS may indicate or configure the maximum number of reserved DMRS ports, N, to the UE through L1 signaling or higher layer signaling (e.g., RRC signaling) The UE may select one of integer values from X to X+N−1 based on a value X given for an antenna port in scheduling information for PUSCH transmission and use the selected antenna port to represent a transmission parameter.

In Terms of BS:

The aforementioned some implementations of the present disclosure are described in terms of a BS.

Figure 13:
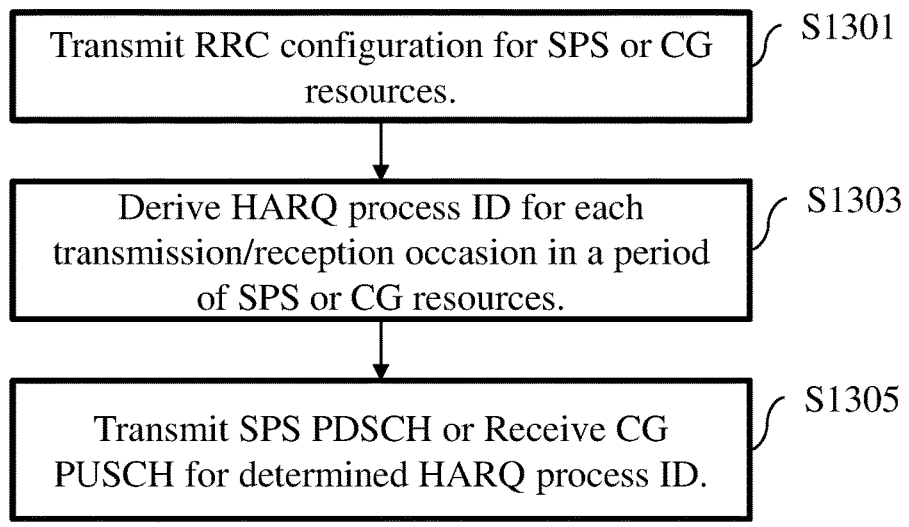
FIG. 13 shows an example of a channel transmit/receive flow in a BS according to some implementations of the present disclosure.

FIG. 13 shows an example of a channel transmit/receive flow in a BS according to some implementations of the present disclosure.

When the BS allocates an SPS/CG resource to the UE and performs transmission or reception based on the allocated SPS/CG resource, a HARQ process ID to be used at an SPS/CG occasion in which the BS performs transmission or reception may be determined through implementations of the present disclosure. An example of a BS operation according to some implementations of the present disclosure will be described below.

The BS may configure RRC parameter(s) for SPS or CG resources to the UE (S1301). For example, the BS may transmit an SPS configuration or a CG configuration to the UE via RRC signaling.

The BS may transmit activation DCI for the SPS/CG resource configured to the UE. Transmitting the activation DCI may be omitted according to the SPS/CG resource configuration. For example, when the UE uses a Type 1 CG resource, transmitting the activation DCI may be omitted.

The BS may determine an SPS reception occasion or CG transmission occasion based on the activation DCI and/or RRC parameter(s) for the SPS/CG resource.

If there are multiple transmission occasions/reception occasions for one or more transport blocks (TBs) within a specific period, the BS may determine a set of HARQ process IDs to be used in one period, that is, a HARQ process pool based on the configured RRC parameter(s) and the activation DCI.

The BS may determine a HARQ process ID for each reception/transmission occasion based on the HARQ process pool in order to receive and transmit SPS/CG in the specific period (S1303).

Through the determined HARQ process ID, the BS may receive an SPS PDSCH or transmit a CG PUSCH (S1305).

In some implementations of the present disclosure, the following BS operation may be considered. In the present disclosure, the BS operations are described based on uplink transmission using a grant mainly configured for convenience of explanation, but implementations of the present disclosure are not limited thereto. As an example, implementations of the present disclosure may also be applied to downlink SPS. When implementations of the present disclosure are applied to downlink SPS, the BS may perform an SPS-based transmission operation and the UE may perform an SPS-based reception operation.

<Implementation B1> UE Selects and Reports HARQ Process ID from Entire HARQ Process Pool A BS may assume that a UE determines which HARQ process ID to use for each transmission within a range of the configured HARQ process Ds and reports the determined HARQ process IDs to the BS along with the corresponding PUSCH transmission, and receive the PUSCH transmission. The range of configured HARQ process IDs may be determined based on CG parameter(s). For example, a starting HARQ process ID X and the number N to be used through the corresponding CG configuration may be configured, and thus the HARQ process ID may be configured to be used in a range of [X, X+N−1].

In order for the UE to transmit the selected HARQ process ID to the BS, the UE may separately encode the HARQ process ID or transmission parameters (e.g., HARQ process ID, NDI, MCS and/or RV) including the HARQ process ID and may transmit the encoded information via a PUSCH along with the UL-SCH. In this case, a conventional method in which a UE transmits required UCI (e.g., HARQ process ID, redundancy version (RV), new data indicator (NDI), and channel occupancy time sharing information) with a UL-SCH on a CG-based PUCSH in an unlicensed band may be used. For example, in some implementations of the present disclosure, the BS may receive HARQ process ID, RV, NDI, MCS, and/or channel occupancy time sharing information along with UL-SCH, that is, uplink data, on the CG-based PUSCH.

In some scenarios, when PUSCH repetition type B is indicated or configured to the UE, the UE may repeat one PUSCH scheduling with K nominal repetitions based on a given repeated transmission factor K, and may consider the following for implementation A1 when each nominal PUSCH in uplink is divided into K' actual repetitions in consideration of invalid symbol(s) and a slot boundary.

<Implementation B1-1>

In implementation B1, a HARQ process ID or a transmission parameter including the HARQ process ID may be separately encoded and transmitted together only for first actual repetition, and the BS may receive the information. In implementation B1-1, the HARQ process ID may be transmitted on actual repetition for transmitting UCI such as other HARQ-ACK feedback, SR, and CSI, and thus a UL-SCH, UCI, and the HARQ process ID may be transmitted together on the same PUSCH as much as possible. This may simplify an operation of the BS by reducing the number of PUSCH de-multiplexing of the BS and may cause the BS to recognize whether the corresponding repeated transmission is first repeated transmission among repeated transmissions depending on whether the repeated transmission includes a HARQ process ID to be separately decoded.
<Implementation B1-2>

In implementation B1, a HARQ process ID or a transmission parameter including the HARQ process ID may be separately encoded and transmitted together for all actual repetitions, and the BS may receive the information In implementation B1-2, even if the BS fails to receive specific PUSCH repetition, the BS may recognize a HARQ process ID related to the corresponding PUSCH transmission based on transmission parameters included in other PUSCH repetitions. In implementation B1-1, when a PUSCH carrying the HARQ process ID is not properly received, there is a risk that the BS misidentifies a HARQ process and combines the corresponding transmission in HARQ process buffers with different HARQ process IDs. In order to avoid the problem of implementation B1-1, implementation B1-2 may be used.
<Implementation B1-3>

In implementation A1, a HARQ process ID or a transmission parameter including the HARQ process ID may be transmitted together only in PUSCH repetitions that satisfy a specific condition (or do not satisfy a specific condition). For example, implementation A1 may be used for a PUSCH that satisfies the following conditions.

The BS may not assume that the UE includes the HARQ process ID and transmission parameters in the PUSCH having a transmission time length of X symbols or less. Here, X may be 1. This is to minimize UCI included in the PUSCH and maximize radio resources to be used for a UL-SCH among the radio resources of the PUSCH. Accordingly, the UL-SCH may be transmitted in limited resource element(s) of a short PUSCH.

The BS may not assume that the UE includes the HARQ process ID and transmission parameters in the PUSCH in which the number of REs used for UL-SCH transmission is X or less. X*M/TBS=C, where M is a modulation order, TBS is a transport block size, and C is a code rate. C may be 1 or a value obtained by multiplying a code rate given from MCS by a real number less than 1.

<Implementation B2> UE Selects (and Reports) HARQ Process ID from Sub-HARQ Process Pool A UE may determine a range of HARQ process IDs to be used for each period. The BS may assume that the UE determines which HARQ process ID is to be used for each transmission within the corresponding range of HARQ process IDs and reports the information to the BS along with PUSCH transmission, and may receive the PUSCH transmission. The range of HARQ process IDs within each period may be determined based on CG parameter(s). For example, a starting HARQ process ID X to be used in each period and the number N of HARQ process IDs to be used in each period may be determined based on the CG parameter(s). Through this, the HARQ process ID to be used in a specific period may be determined in a range of [X, X+N−1].

In implementation B2, a starting HARQ process ID X to be used in each period and the number N of HARQ process IDs in each period may be determined through the following method(s).
<Implementation B2-1>

A starting HARQ process ID to be used in each period may be determined through the following equation: {floor (symbol index/periodicity)*(HPN interval)} modulo nrof-HARQ-Processes+harq-ProcID-Offset. Alternatively, a starting HARQ process ID to be used in each period may be determined through the following equation: {ceil(symbol index/periodicity)*(HPN interval)} modulo nrofHARQ-Processes+harq-ProcID-Offset.

In the above equation, "symbol index" denotes a symbol index, that is, the number of symbols to a start symbol of a first PUSCH occasion in a period from SFN=0, and the symbol index may be represented using the following equation: symbol index=(SFN*numberOfSlotsPerFrame*numberOfSymbolsPerSlot+slot number in the frame*numberOfSymbolsPerSlot+symbol number in the slot), and here, numberOfSlotsPerFrame and numberOfSymbolsPerSlot refer to the number of consecutive slots per frame and the number of consecutive OFDM symbols per slot (refer to 3GPP TS 38.211).

In the above equation, periodicity is a symbol length of a period configured for an SPS/CG resource in one SPS/CG configuration (i.e., the number of symbols included in the configured period).

In the above equation, nrofHARQProcesses is the number of available HARQ process(s) configured for an entire SPS/CG resource in one SPS/CG configuration.

In the above equation, harqProcIDOffset is a parameter value configured to determine the starting HARQ process ID of the available HARQ process(s). nrofHARQProcesses HARQ processes from a HARQ process with a HARQ process ID of harqProcIDOffset may be sequentially used as the available HARQ process(s).

In the above equation, a HPN interval, that is, a HARQ processor number interval may be a minimum difference between starting HARQ process IDs to be used in different periods. In some implementations of the present disclosure, the HPN interval may be determined through at least one of the following.

The number of PUSCH transmission occasions (e.g., nominal PUSCH occasions) in a period (or the number of actual PUSCHs). Repeated PUSCH transmission may be configured through one or more parameters, such as the number of PUSCH repetitions per slot (e.g., cg-nrofPUSCH-InSlot) and the number of slot repetitions (e.g., cg-nrofSlots). In this case, the number of PUSCH transmission occasions finally created by the corresponding parameters may be used as the HPN interval. For example, the HPN interval may be determined to be cg-nrofPUSCH-InSlot*cg-nrofSlots, which is the product of the two parameters cg-nrofSlots and cg-nrofPUSCH-InSlot.

The indicated or configured number of repeated transmissions (e.g., RepK) of a CG PUSCH (or the number of nominal PUSCHs). When the indicated or configured number of repeated transmissions and the number of PUSCH transmission occasions in a period are different, ceil{(number of PUSCH transmission occasions in a period)/(indicated or configured number of repeated transmissions)} or floor{(number of PUSCH transmission occasions)/(indicated or configured number of repeated transmissions)} may be used as the HPN interval. This allows one HARQ process ID to have as many PUSCH transmission occasions as the indicated or configured number of repeated transmissions within a period. For example, among PUSCH occasions within a period, at least as many PUSCH occasions as the indicated or configured number of repeated transmissions may be related to one HARQ process ID.

L1 signaling by BS (e.g., DCI over PDCCH), or higher layer signaling.

<Implementation B2-2>

The number N of HARQ process IDs to be used in each period may be determined through at least one of the following.

An HPN interval value determined in implementation A2-1 is used.

When the HPN interval value determined in implementation A2-1 is not used, a HPN value is determined using the same method as the method used to determine the HPN interval value in implementation A2-1. For example, N may be determined through at least one of the following.

The number of PUSCH transmission occasions in a period (or the number of actual PUSCHs). Repeated PUSCH transmission may be configured through one or more parameters, such as the number of PUSCH repetitions per slot (e.g., cg-nrofPUSCH-InSlot) and the number of slot repetitions (e.g., cg-nrofSlots). In this case, the number of PUSCH transmission occasions finally created by corresponding parameters may be used as the HPN interval. For example, the HPN interval may be determined to be cg-nrofPUSCH-InSlot*cg-nrofSlots, which is the product of the two parameters cg-nrofSlots and cg-nrofPUSCH-InSlot.

The indicated or configured number of repeated transmissions (e.g., RepK) of a CG PUSCH (or the number of nominal PUSCHs). When the indicated or configured number of repeated transmissions and the number of PUSCH transmission occasions in a period are different, ceil{(number of PUSCH transmission occasions in a period)/(indicated or configured number of repeated transmissions)} or floor{(number of PUSCH transmission occasions)/(indicated or configured number of repeated transmissions)} may be used as the HPN interval. This allows one HARQ process ID to have as many PUSCH transmission occasions as the indicated or configured number of repeated transmissions within a period. For example, among PUSCH occasions within a period, at least as many PUSCH occasions as the indicated or configured number of repeated transmissions may be related to one HARQ process ID.

L1 signaling by BS, or higher layer signaling

<Implementation B2-3>

The BS may assume that the UE determines which HARQ process ID to use for each PUSCH transmission of the corresponding period within a range of HARQ process IDs determined in a specific period and reports the determined information to the BS along with PUSCH transmission, and may receive the PUSCH transmission.

In order to transmit the HARQ process ID selected by the UE to the BS, the UE may separately encode the HARQ process ID or transmission parameters including the HARQ process ID (e.g., HARQ process ID, NDI, and/or MCS) and transmit the encoded information via the PUSCH together with a UL-SCH. In this case, a conventional method in which a UE transmits a CG-UCI on a PUCSH in an unlicensed band and/or implementation B1 may be used. For example, in some implementations of the present disclosure, the BS may receive HARQ process ID, RV, NDI, MCS, and/or channel occupancy time sharing information along with a UL-SCH, that is, uplink data on a CG-based PUSCH.

<Implementation B2-4>

In implementation B2, the BS may assume that a HARQ process ID within a range of HARQ process IDs determined in a specific period is mapped to each PUSCH transmission in the corresponding period. When a starting HARQ process ID of a period determined through implementation B2 is X and the number of HARQ process IDs in a period is N, an n-th PUSCH occasion in time within the corresponding period may have the following HARQ process ID: HARQ process ID for n-th PUSCH occasion=X+mod(n−1, N). Here, the starting HARQ process ID X of each period may be determined according to implementation B2-1, and the number N of HARQ process Ins for each period may be determined according to implementation B2-2.

Referring to FIG. 12, HARQ process Ins {0,1,2,3} and HARQ process IDs {4,5,6,7} are for two periods, respectively, and the HARQ process IDs may be mapped to CG PUSCHs in the respective periods.

<Implementation B3> HARQ Process ID Mapped at HPN Interval

In some implementations, a UE may sequentially use HARQ process IDs for respective periods in a range of HARQ process IDs determined based on parameter(s) included in an SPS/CG configuration. In this case, the minimum distance between PUSCH occasions having the same HARQ process ID may always be the same.

A UE communicating in an unlicensed band always has a risk of transmission failure, and in order to reduce problems that may arise from this risk, retransmission is performed on the configured CG PUSCH without receiving a PDCCH (for scheduling retransmission) separately. In this case, if a distance between PUSCH occasions having the same HARQ process ID is always the same, when transmission fails on a first CG PUSCH occasion, retransmission performed on a CG PUSCH suffers a delay.

In implementation B3, some HARQ process IDs may appear multiple times within a period, allowing the UE to quickly attempt two or more CG PUSCH transmissions within one period. According to implementation B3, the UE may transmit traffic for which reliability is important for an HARQ process ID having multiple transmission opportunities. Through this, it may be possible to minimize a risk due to Listen before talk (LBT) and/or Channel access procedure (CAP) failure that may occur in an unlicensed band.

For example, the BS may determine a starting HARQ process ID X to be used in each period, and determine a HARQ process ID to be used in each PUSCH transmission opportunity within the corresponding period. In this case, in order to determine the starting HARQ process ID X, a method of determining the HARQ process ID to be used for each period (refer to the HARQ process ID described in "Resource Allocation by RRC") may be used, or a method of determining the starting HARQ process ID described in implementation B2 may be used.

When the starting HARQ process ID of a determined period is X, the n-th PUSCH occasion in time within the corresponding period may have the following HARQ process ID: HARQ process for n-th PUSCH occasion=X+mod (K*(n−1), nrofHARQProcesses).

In the above equation, nrofHARQProcesses may refer to the number of available HARQ processes configured for all SPS/CG resources in one SPS/CG configuration.

In the above equation, K is an HPN interval, and the HPN interval is a minimum difference between HARQ process IDs to be used in different PUSCH occasions in one period. The HPN interval may be determined through at least one of the following.

Occasions of PUSCH transmission occasions within period (or the number of actual PUSCHs)

Indicated or configured number of repeated transmissions of a CG PUSCH (or the number of nominal PUSCHs).

Repeated PUSCH transmission may be configured through one or more parameters, such as the number of PUSCH repetitions per slot and the number of slot repetitions. In this case, the number of repeated transmissions finally made by the corresponding parameters may be used as the HPN interval. For example, the product of two parameters (e.g., the number of PUSCH repetitions per slot and the number of slot repetitions) may be used as the HPN interval.

L1 signaling by BS, or higher layer signaling.

<Implementation B4> Indicate UE-Centric Transmission Parameter

The BS may assume that the UE indicates to the BS a transmission parameter such as NDI and RV selected by the UE for PUSCH transmission, and may receive the information. In this case, an orthogonal DMRS port configured to the UE may be used to indicate the transmission parameters to the BS.

When implementation B3 or implementation B2 is applied, the UE and BS may deterministically derive the HARQ process ID of each transmission occasion. However, in order to still perform UE-centric transmission such as autonomous retransmission, it may be necessary to separately encode transmission parameters such as NDI and RV and transmit the encoded information along with a UL-SCH on a PUSCH. This series of processes may impose an additional burden on UCI transmission of the UE. Therefore, it may be considered to minimize the amount of information of a transmission parameter required for UE-centric transmission and to express the transmission parameter using a DMRS or other reference signals transmitted along with the PUSCH instead of encoding and including the information separately to express the reduced amount of information.

By allowing the BS to reserve n DMRS ports for one UE and allowing the UE to select one of the DMRS ports, the UE may express n types of information. For example, the BS may reserve two DMRS ports for the UE, select a first DMRS port when the UE performs transmission with NDI=0, and select a second DMRS port when performing transmission with NDI=1. Alternatively, the first DMRS port may be selected when transmission in which NDI is toggled is performed, and the second DMRS port may be selected when transmission in which NDI is not toggled is performed.

The BS may indicate or configure the maximum number of reserved DMRS ports, N, to the UE through L1 signaling or higher layer signaling (e.g., RRC signaling). The UE may select one of integer values from X to X+N−1 based on a value X given for an antenna port in scheduling information for PUSCH transmission and use the selected antenna port to represent a transmission parameter.

Figure 14:
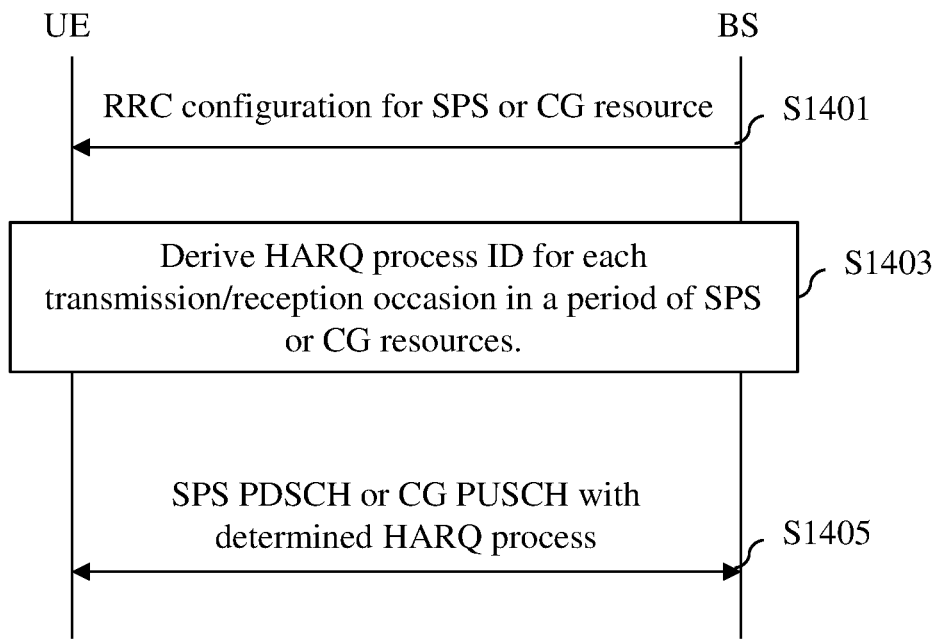
FIG. 14 shows an example of a signal transmit/receive flow between a UE and a BS according to some implementations of the present disclosure.

FIG. 14 shows an example of a signal transmit/receive flow between a UE and a BS according to some implementations of the present disclosure.

Referring to FIG. 14, the BS may configure an SPS/CG resource to the UE (S1401). If necessary, the BS may transmit activation DCI for activating the configured SPS/CG resource. The UE may receive an RRC configuration for configuring the SPS/CG configuration from the BS. Then, the UE may monitor and receive the activation DCI for the SPS/CG resource. According to a type of the SPS/CG resource, the activation DCI may not be required. After the SPS/CG activation, the UE and the BS may determine a HARQ process ID to be used in an SPS/CG occasion according to some implementations of the present disclosure (S1403). Based on the determined HARQ process ID, the UE and the BS may transmit or receive a SPS PDSCH or a CG PUSCH (S1405).

According to some implementations of the present disclosure, the UE may inform the BS of the HARQ process ID of PUSCH transmission while minimizing an impact of the UE on the reliability of UL-SCH transmission within a given resource pattern. In addition, a HARQ process ID may be deterministically determined in a given resource pattern, and resources used for announcing HARQ IDs may be saved, thereby improving the reliability of UL-SCH transmission.

For transmission of an uplink channel, the UE may perform operations according to some implementations of the present disclosure. The UE may include: at least one transceiver; at least one processor; and at least one computer memory operably connected to the at least one processor and configured to store instructions that, when executed, cause the at least one processor to perform the operations according to some implementations of the present disclosure. A processing device for the UE may include: at least one processor; and at least one computer memory operably connected to the at least one processor and configured to store instructions that, when executed, cause the at least one processor to perform the operations according to some implementations of the present disclosure. A computer-readable (non-volatile) storage medium may store at least one computer program including instructions that, when executed by at least one processor, cause the at least one processor to perform the operations according to some implementations of the present disclosure. A computer program or computer program product may include instructions that are stored on at least one computer-readable (non-volatile) storage medium and, when executed, cause (at least one processor) to perform the operations according to some implementations of the present disclosure.

In the UE, the processing device, the computer readable (non-transitory) storage medium, and/or the computer program product, the operations include: receiving a UL grant configuration for configured UL grants; determining HARQ process IDs for a period of the configured UL grants based on the UL grant configuration; and performing UL channel transmission in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval. The HARQ process ID interval is a minimum difference between starting HARQ process IDs for different periods.

For reception of an uplink channel, the BS may perform operations according to some implementations of the present disclosure. The BS may include: at least one transceiver; at least one processor; and at least one computer memory operably connected to the at least one processor and configured to store instructions that, when executed, cause the at least one processor to perform the operations according to some implementations of the present disclosure. A processing device for the BS may include: at least one processor; and at least one computer memory operably connected to the at least one processor and configured to store instructions that, when executed, cause the at least one processor to perform the operations according to some implementations of the present disclosure. A computer-readable (non-volatile) storage medium may store at least one computer program including instructions that, when executed by at least one processor, cause the at least one processor to perform the operations according to some implementations of the present disclosure. A computer program or computer program product may include instructions that are stored on at least one computer-readable (non-volatile) storage medium and, when executed, cause (at least one processor) to perform the operations according to some implementations of the present disclosure.

In the UE, the processing device, the computer readable (non-transitory) storage medium, and/or the computer program product, the operations include: transmitting a UL grant configuration for configured UL grants; determining HARQ process IDs for a period of the configured UL grants based on the UL grant configuration; and receiving UL channel transmission of the UE in at least one of transmission occasions corresponding to the configured UL grants in the period based on the determined HARQ process IDs. Determining the HARQ process IDs for the period includes determining a starting HARQ process ID among the HARQ process IDs based on a HARQ process ID interval. The HARQ process ID interval is a minimum difference between starting HARQ process IDs for different periods.

In some implementations of the present disclosure, determining the HARQ process IDs for the period includes determining the starting HARQ process ID among the HARQ process IDs based on a start symbol index of a first transmission occasion in the period, the number of available HARQ processes for the UL grant configuration, a configured HARQ process offset for the UL grant configuration, and the HARQ process ID interval.

In some implementations of the present disclosure, the starting HARQ process ID may be determined according to the following equation: {(symbol index/periodicity)*(HPN interval)} modulo nrofHARQ-Processes+harq-ProcID-Offset.

In some implementations of the present disclosure, the HARQ process ID interval may be determined based on the number of transmission occasions in the period.

In some implementations of the present disclosure, the HARQ process ID interval may be determined based on the number of repeated transmissions related to the configured UL configuration.

In some implementations of the present disclosure, the operations may include further receiving information on the HARQ process ID interval.

In some implementations of the present disclosure, the UL channel transmission may include a HARQ process ID for the UL channel transmission The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

What is claimed is:

1. A method by a user equipment (UE), the method comprising:

receiving a configured grant (CG) configuration supporting multiple CG physical uplink shared channel (PUSCH) occasions in a periodicity of the CG configuration;

determining at least one hybrid automatic repeat request (HARQ) process ID for the multiple CG PUSCH occasions in the periodicity of the CG configuration; and performing an uplink transmission in a CG PUSCH occasion in the periodicity of the CG configuration based on a HARQ process ID for the CG PUSCH occasion, wherein a HARQ process ID for a first CG PUSCH occasion in the periodicity of the CG configuration among the at least one HARQ process ID is determined based on a number of CG PUSCH occasions in the periodicity of the CG configuration.

2. The method of claim 1, further comprising:

obtaining information regarding the number of CG PUSCH occasions in the periodicity of the CG configuration based on a parameter provided for the CG configuration.

3. The method of claim 1, wherein performing the uplink transmission includes:

transmitting the HARQ process ID for the uplink transmission.

4. The method of claim 1, wherein the HARQ process ID for the first CG PUSCH occasion in the periodicity of the CG configuration is determined based on a start symbol index of the first CG PUSCH occasion in the periodicity of the CG configuration, periodicity provided for the CG configuration, a number of HARQ processes configured for the CG configuration, and the number of CG PUSCH occasions in the periodicity of the CG configuration.

5. The method of claim 4, wherein the HARQ process ID for the first CG PUSCH occasion in the periodicity of the CG configuration is determined based on:

$\{(X*M) \text{ modulo } L\}+O$, and wherein X is a value obtained based on S/P, where S is the start symbol index, and P is the periodicity provided for the CG configuration, M is the number of CG PUSCH occasions in the periodicity of the CG configuration, L is the number of HARQ processes configured for the CG configuration, and O is a HARQ process offset configured for the CG configuration.

6. The method of claim 1, wherein the at least one HARQ process ID for the multiple CG PUSCH occasions in the periodicity of the CG configuration includes N consecutive HARQ process IDs including the HARQ process ID for the first CG PUSCH occasion in the periodicity of the CG configuration.

7. The method of claim 6, wherein the N consecutive HARQ process IDs are cyclically related to the multiple CG PUSCH occasions in the periodicity of the CG configuration starting with the HARQ process ID for the first CG PUSCH occasion in the periodicity of the CG configuration.

8. A user equipment (UE) comprising:

at least one transceiver;

at least one processor; and at least one computer memory operatively connected to the at least one processor and configured to store instructions that when executed causes the at least one processor to perform operations comprising:

receiving a configured grant (CG) configuration supporting multiple CG physical uplink shared channel (PUSCH) occasions within a periodicity of the CG configuration;

determining at least one hybrid automatic repeat request (HARQ) process ID for the multiple CG PUSCH occasions in the periodicity of the CG configuration; and performing an uplink transmission in a CG PUSCH occasion in the periodicity of the CG configuration based on a HARQ process ID for the CG PUSCH occasion, wherein a HARQ process ID for a first CG PUSCH occasion in the periodicity of the CG configuration among the at least one HARQ process ID is determined based on a number of CG PUSCH occasions in the periodicity of the CG configuration.

9. The UE claim 8, wherein the operations further comprise:
obtaining information regarding the number of CG PUSCH occasions in the periodicity of the CG configuration based on a parameter provided for the CG configuration.

10. The UE of claim 8, wherein the HARQ process ID for the first CG PUSCH occasion in the periodicity of the CG configuration is determined based on a start symbol index of the first CG PUSCH occasion in the periodicity of the CG configuration, periodicity provided for the CG configuration, a number of HARQ processes configured for the CG configuration, and the number of CG PUSCH occasions in the periodicity of the CG configuration.

11. The UE of claim 10, wherein the HARQ process ID for the first CG PUSCH occasion in the periodicity of the CG configuration is determined based on:
{(X*M) modulo L}+O, and
wherein X is a value obtained based on S/P, where S is the start symbol index, and P is the periodicity provided for the CG configuration, M is the number of CG PUSCH occasions in the periodicity of the CG configuration, L is the number of HARQ processes configured for the CG configuration, and O is a HARQ process offset configured for the CG configuration.

12. The UE of claim 8, wherein the at least one HARQ process ID for the multiple CG PUSCH occasions in the periodicity of the CG configuration includes N consecutive HARQ process IDs including the HARQ process ID for the first CG PUSCH occasion in the periodicity of the CG configuration.

13. The UE of claim 12, wherein the N consecutive HARQ process IDs are cyclically related to the multiple CG PUSCH occasions in the periodicity of the CG configuration starting with the HARQ process ID for the first CG PUSCH occasion in the periodicity of the CG configuration.

14. A base station (BS) comprising:
at least one transceiver;
at least one processor; and
at least one computer memory operatively connected to the at least one processor and configured to store instructions that when executed causes the at least one processor to perform operations including:

transmitting a configured grant (CG) configuration supporting multiple CG physical uplink shared channel (PUSCH) occasions in a periodicity of the CG configuration;

determining at least one hybrid automatic repeat request (HARQ) process ID for the multiple CG PUSCH occasions in the periodicity of the CG configuration; and receiving an uplink transmission in a CG PUSCH occasion in the periodicity of the CG configuration based on a HARQ process ID for the CG PUSCH occasion, wherein a HARQ process ID for a first CG PUSCH occasion in the periodicity of the CG configuration among the at least one HARQ process ID is determined based on a number of CG PUSCH occasions in the periodicity of the CG configuration.

15. The BS claim 14, wherein the operations further comprise:
transmitting information regarding the number of CG PUSCH occasions in the periodicity of the CG configuration based on a parameter provided for the CG configuration.

16. The BS of claim 14, wherein the HARQ process ID for the first CG PUSCH occasion in the periodicity of the CG configuration is determined based on a start symbol index of the first CG PUSCH occasion in the periodicity of the CG configuration, periodicity provided for the CG configuration, a number of HARQ processes configured for the CG configuration, and the number of CG PUSCH occasions in the periodicity of the CG configuration.

17. The BS of claim 16, wherein the HARQ process ID for the first CG PUSCH occasion in the periodicity of the CG configuration is determined based on:
{(X*M) modulo L}+O, and
wherein X is a value obtained based on S/P, where S is the start symbol index, and P is the periodicity provided for the CG configuration, M is the number of CG PUSCH occasions in the periodicity of the CG configuration, L is the number of HARQ processes configured for the CG configuration, and O is a HARQ process offset configured for the CG configuration.

18. The BS of claim 14, wherein the at least one HARQ process ID for the multiple CG PUSCH occasions in the periodicity of the CG configuration includes N consecutive HARQ process IDs including the HARQ process ID for the first CG PUSCH occasion in the periodicity of the CG configuration.

19. The BS of claim 18, wherein the N consecutive HARQ process IDs are cyclically related to the multiple CG PUSCH occasions in the periodicity of the CG configuration starting with the HARQ process ID for the first CG PUSCH occasion in the periodicity of the CG configuration.

* * * * *